US007519182B2

(12) United States Patent
Shimosato et al.

(10) Patent No.: US 7,519,182 B2
(45) Date of Patent: Apr. 14, 2009

(54) ENCRYPTION DEVICE AND DECRYPTION DEVICE

(75) Inventors: Tsutomu Shimosato, Kanagawa (JP); Yujiro Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 10/482,972

(22) PCT Filed: May 7, 2003

(86) PCT No.: PCT/JP03/05678

§ 371 (c)(1),
(2), (4) Date: May 9, 2005

(87) PCT Pub. No.: WO03/096610

PCT Pub. Date: Nov. 20, 2003

(65) Prior Publication Data

US 2005/0213754 A1    Sep. 29, 2005

(30) Foreign Application Priority Data

May 10, 2002    (JP)    ............................. 2002-135079

(51) Int. Cl.
*H04L 9/00*    (2006.01)
(52) U.S. Cl. ........................................ 380/268; 713/168
(58) Field of Classification Search .................. 380/42, 380/46, 48, 213, 255, 268; 360/46; 713/168; 714/762
See application file for complete search history.

(56) References Cited

U.S. PATENT DOCUMENTS 5,122,912 A  *  6/1992  Kanota et al. .................. 360/46

| 5,216,714 A | * | 6/1993 | Speiser ........................ 380/268 |
| 5,283,831 A | * | 2/1994 | Cook et al. .................. 380/268 |
| 5,323,463 A | * | 6/1994 | Speiser ........................ 380/256 |
| 6,081,600 A | * | 6/2000 | Blanchard et al. ............ 380/255 |
| 6,269,164 B1 | * | 7/2001 | Pires ............................ 380/42 |

(Continued)

FOREIGN PATENT DOCUMENTS

JP    62-171341    7/1987
JP    8-163119    6/1996

OTHER PUBLICATIONS

Spanos, G.A; Security for real-time MPEG compressed video in distributedmultimedia applications; Publication Date: Mar. 27-29, 1996; INSPEC: on pp. 72-78.*

(Continued)

*Primary Examiner*—Kambiz Zand
*Assistant Examiner*—Monjour Rahim
(74) *Attorney, Agent, or Firm*—Frommer Lawrence & Haug LLP; William S. Frommer; Thomas F. Presson

(57) ABSTRACT

An apparatus for enciphering digital information data with improved cipher strength by subjecting digital information data to enciphered process responding to random number data or pseudo-random number data produced in accordance with key data. The apparatus comprises an enciphering portion for producing the enciphered digital information data, a cipher producing portion for producing, in response to the key data, a cipher data from which random number data or pseudo-random number data are obtained to be supplied to the enciphering portion, a register for supplying the cipher producing portion with input data, and an initial value data generator for supplying the register with enciphered initial value data.

24 Claims, 17 Drawing Sheets

U.S. PATENT DOCUMENTS

| | | | |
|---|---|---|---|
| 6,334,186 B1 * | 12/2001 | Uematsu | 713/168 |
| 6,345,101 B1 * | 2/2002 | Shukla | 380/210 |
| 6,487,293 B2 * | 11/2002 | Sako et al. | 380/201 |
| 6,570,990 B1 * | 5/2003 | Kohn et al. | 380/213 |
| 6,662,332 B1 * | 12/2003 | Kimmitt | 714/762 |
| 6,845,159 B1 * | 1/2005 | Domstedt et al. | 380/44 |

OTHER PUBLICATIONS

Tatsuaki Okamoto, Hiroshi Yamamoto, "Series/Joho Kagaku no Sugaku, Gendai Ango", Sangyo Tosho Kabushiki Kaisha, Jun. 30, 1998, $2^{nd}$ print, pp. 73 to 76.

* cited by examiner

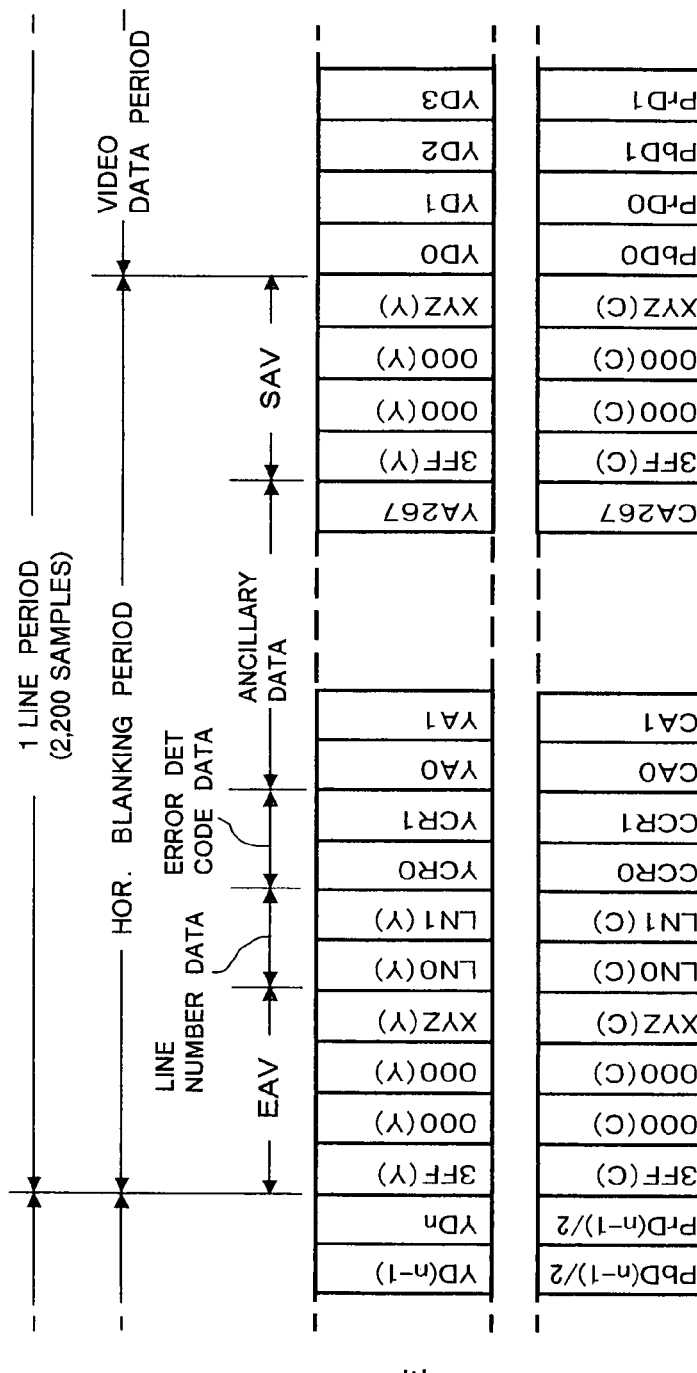
FIG 2A Y DATA SEQUENCE
FIG 2B Pb/Pr DATA SEQUENCE

ENCRYPTION DEVICE AND DECRYPTION DEVICE

TECHNICAL FIELD

The present invention relates to each of an apparatus for enciphering data which subjects digital information data to enciphering process for producing enciphered digital information data and an apparatus for deciphering data which subjects enciphered digital information data to deciphering process for reproducing original digital information data.

TECHNICAL BACKGROUND

In the field of data transmission by which digital data representing various kinds of signal information are transmitted, there have been proposed to subject digital data set to be transmitted to enciphering process at a transmission side and to reproduce original data by subjecting the enciphered digital data to deciphering process at a receiving side, in order to prevent the digital data from being eavesdropped on a data transmission line. One of typical algorisms for enciphering digital data is the DES (Date Encryption Standard) published in 1977 by the National Bureau of Standards, the United State of America.

With cipher-transmission based on the DES, digital data are enciphered in accordance with rules determined by enciphering key data prepared previously to produce enciphered digital data and the enciphered digital data are deciphered in accordance with rules determined by deciphering key data prepared previously to reproduce original digital data. The deciphering key data are prepared to be the same as the enciphering key data so that each of the deciphering key data and the enciphering key data are formed with common data. The algorisms for enciphering and deciphering have been opened to the public and the common key data are kept secret for the purpose of enciphering.

FIG. 1 shows a basic structure of a cipher-transmission system according to the DES. In the basic structure shown in FIG. 1, digital data to be transmitted are supplied to a DES enciphering portion 11 as original data. Enciphering key data prepared previously are also supplied to the DES enciphering portion 11. In the DES enciphering portion 11, the original data are subjected to the DES enciphering process in accordance with the rules determined by the enciphering key data to produce enciphered data. The enciphered data obtained from the DES enciphering portion 11 are transmitted through a data transmission line 12 having one end thereof connected with the DES enciphering portion 11.

The enciphered data having been transmitted through the data transmission line 12 are supplied to a DES deciphering portion 13 with which the other end of the data transmission line 12 is connected. Deciphering key data which is the same as the enciphering key data are also supplied to the DES deciphering portion 13. In the DES deciphering portion 13, the enciphered data are subjected to the DES deciphering process in accordance with the rules determined by the deciphering key data to reproduce the original data.

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of digital word sequence data representing video signal information. The digital video signal under the HDTV system (hereinafter, referred to the HD signal) is formed in accordance with, for example, the BTA S-002 which is one of a series of standards established by the Broadcasting Technology Association (BTA) in Japan so as to be in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD signal is a digital television signal by which each frame picture is formed with first and second field pictures each appearing at a rate of 60 Hz and which is constituted in accordance with an arrangements including a frame rate of 30 Hz, 1125 lines per frame, 2,200 data samples per line and a sampling frequency of 74.25 MHz. For example, the HD signal in the form of Y and $P_B/P_R$ signals is constituted in accordance with such data formats as shown in FIGS. 2A and 2B.

The data formats shown in FIGS. 2A and 2B include a part of a portion corresponding to a line period (hereinafter, referred to a line period portion) of a luminance signal data sequence (hereinafter, referred to a Y data sequence) as shown in FIG. 2A, which represents a luminance signal component of a video signal, and a part of a line period portion of a color difference signal data sequence (hereinafter, referred a $P_B/P_R$ data sequence) as shown in FIG. 2B, which represents color difference signal components of the video signal. Each of data words constituting the Y data sequence or the $P_B/P_R$ data sequence is composed of 10 bits. This means that each of the Y data sequence and the $P_B/P_R$ data sequence constitutes 10-bit word sequence data having a word transmission rate of, for example, 74.25 Mwps.

In the Y data sequence, each line period portion of which is formed with a portion corresponding to a horizontal blanking period and a portion corresponding to a video data period appearing after the horizontal blanking period, time reference code data SAV (Start of Active Video) which are composed of four 10-bit words (3FF(Y), 000(Y), 000(Y); XYZ(Y) 3FF and 000 are hexadecimal numbers and often mentioned with "h" which indicates a hexadecimal number in such a manner as 3FFh and 000h, and (Y) indicates a word contained in the Y data sequence.) are provided just before the portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the $P_B/P_R$ data sequence, each line period portion of which is formed with a portion corresponding to a horizontal blanking period and a portion corresponding to a video data period appearing after the horizontal blanking period, time reference code data SAV which are composed of four 10-bit words (3FF(C), 000(C), 000(C), XYZ(C); (C) indicates a word contained in the $P_B/P_R$ data sequence.) are provided just before the portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence are provided in the portion corresponding to the horizontal blanking period of the Y data sequence and the time reference code data EAV and SAV contained in the $P_B/P_R$ data sequence are provided in the portion corresponding to the horizontal blanking period of the $P_B/P_R$ data sequence.

Initial three 10-bit words (3FF, 000, 000) of four 10-bit words (3FF, 000, 000, XYA), each of which is shown with (Y) or (C), are used for establishing word synchronization or line synchronization and a last one 10-bit word (XYZ) of four 10-bit words (3FF, 000, 000, XYA), which is also shown with (Y) or (C), is used for discriminating the first field from the second field in each frame or for discriminating the time reference code data EAV from the time reference code data SAV.

Line number data LN0(Y) and LN1(Y) or LN0(C) and LN1(C) which represent a line number of each of lines constituting each frame, error detecting code data YCR0 and YCR1 or CCR0 and CCR1 and ancillary data YA0, YA1, . . . , YA267 or CA0, CA1, . . . , CA267 which include audio data and so on are provided between the time reference code data EAV and the time reference code data SAV in each portion corresponding to the horizontal blanking period of each of the Y data sequence and the $P_B/P_R$ data sequence.

When the HD signal constituted with the Y data sequence and the $P_B/P_R$ data sequence is subjected to transmission through a data transmission line, it is desired for the HD signal to be converted to serial data from word sequence data so as to be subjected to serial transmission through a simplified data transmission line. In connection with the serial transmission of the HD signal constituted with the Y data sequence and the $P_B/P_R$ data sequence, it has been standardized to transmit the HD signal in conformity with the HD SDI (High Definition Serial Digital Interface) according to the BTA S-004 which is one of a series of standards established by the BTA in Japan.

In the transmission of the HD signal in conformity with the HD SDI, the Y data sequence and the $P_B/P_R$ data sequence are multiplexed, with their portions corresponding to the horizontal blanking periods in each of which the time reference code data EAV and SAV are provided and which synchronize with each other, to produce a multiple word sequence as shown in FIG. 3 and then the multiple word sequence is converted to serial data to be transmitted. Each of data words constituting the multiple word sequence shown in FIG. 3 is composed of 10 bits and the word transmission rate of the multiple word sequence shown in FIG. 3 is set to be 74.25 Mwps×2=148.5 Mwps. In the multiple word sequence thus obtained as shown in FIG. 3, multiple time reference code data (multiple SAV) which are composed of eight 10-bit words (3FF(C), 3FF(Y), 000(C), 000(Y), 000(C), 000(Y), XYZ(C), XYZ(Y)) are provided just before the portion corresponding to a video data period and another multiple time reference code data EAV (multiple EAV) which are composed of eight 10-bit words (3FF(C), 3FF(Y), 000(C), 000 (Y), 000(C), 000(Y), XYZ(C), XYZ(Y)) are provided just after the portion corresponding to the video data period.

The each of the 10-bit words constituting the multiple word sequence is sent bit by bit from the least significant bit (LSB) to the most significant bit (MSB) so that the multiple word sequence is converted to a serial data. Then, the serial data is subjected to scrambling process to produce a serial transmission HD signal (hereinafter, referred to an HD-SDI signal) and the HD-SDI signal is transmitted through a data transmission line. The HD-SDI signal thus transmitted has a bit transmission rate of, for example, 148.5 Mwps×10=1.485 Gbps.

In the case of the transmission of the HD-SDI signal through the data transmission line, it is also desired to subject the HD-SDI signal to enciphering process at a transmission side and to reproduce original HD-SDI data by subjecting the enciphered HD-SDI data to deciphering process at a receiving side, in order to prevent the HD-SDI data from being eavesdropped on the data transmission line. Such cipher-transmission of the HD-SDI signal can be theoretically carried out with a cipher-transmission system which is similar to the cipher-transmission system according to the DES having the basic structure shown in FIG. 1.

For example, when an HD signal is converted to an HD-SDI signal in accordance with the HD SDI to be transmitted through a data transmission line and the transmitted HD-SDI signal is reconverted to the HD signal in accordance with the HD SDI to be supplied to, for example, a video projector which operates to display images based on the HD signal, it is considered to have such a cipher-transmission system as shown in FIG. 4 for conducting the cipher-transmission of the HD-SDI signal.

In the cipher-transmission system shown in FIG. 4, an HD-SDI signal DHS derived from an HD-SDI signal generating portion 15, in which an HD signal obtained from a video camera or the like is converted to the HD-SDI signal DHS in accordance with the HD SDI, is supplied to an HD-SDI enciphering portion 16. Enciphering key data DDK prepared previously are also supplied to the HD-SDI enciphering portion 16. In the HD-SDI enciphering portion 16, the HD-SDI signal DHS is first subjected to serial to parallel (S/P) conversion to reproduce the original HD signal constituted with Y and $P_B/P_R$ data sequences and the reproduced HD signal is subjected to the DES enciphering process in accordance with the rules determined by the enciphering key data DDK to produce an enciphered HD signal. Then, in the HD-SDI enciphering portion 16, the enciphered HD signal is subjected to parallel to serial (P/S) conversion to produce enciphered serial data DHSE.

The enciphered serial data DHSE are sent from the HD-SDI enciphering portion 16 to be transmitted through a data transmission line 17 having one end thereof connected with the HD-SDI enciphering portion 16.

The enciphered serial data DHSE having been transmitted through the data transmission line 17 are supplied to an HD-SDI deciphering portion 18 with which the other end of the data transmission line 17 is connected. Deciphering key data DDK which is the same as the enciphering key data DDK supplied to the HD-SDI enciphering portion 16 are also supplied to the HD-SDI deciphering portion 18. In the HD-SDI deciphering portion 18, the enciphered serial data DHSE are subjected to the S/P conversion to reproduce the enciphered HD signal constituted with the enciphered Y and $P_B/P_R$ data sequences each containing the enciphered video data and the HD signal is subjected to the DES deciphering process in accordance with the rules determined by the deciphering key data DDK to reproduce the original HD signal constituted with Y and $P_B/P_R$ data sequences. Then, in the HD-SDI deciphering portion 18, the Y and $P_B/P_R$ data sequences constituting the reproduced HD signal are multiplexed with each other in accordance with the HD SDI to produce a word multiple data sequence and the word multiple data sequence thus obtained are subjected to the P/S conversion to reproduce the HD-SDI signal DHS.

The HD-SDI signal DHS obtained from the HD-SDI deciphering portion 18 is supplied to a video projector 19. In the video projector 19, the HD signal is reproduced from the HD-SDI signal DHS and used for display of images.

There have been proposed such an enciphering circuit as shown in FIG. 5 to be used in the HD-SDI enciphering portion 16 shown in FIG. 4 for subjecting the portion of the HD signal in which the video data and the time reference code data EAV are contained to the DES enciphering process in accordance with the rules determined by the enciphering key data DDK and further proposed such a deciphering circuit as shown in FIG. 6 to be used in the HD-SDI deciphering portion 18 shown in FIG. 4 for subjecting the portion of the enciphered HD signal in which the enciphered video data are contained to the DES deciphering process in accordance with the rules determined by the deciphering key data DDK.

The enciphering circuit shown in FIG. 5 is constituted with an enciphering portion 20 to which digital information data DOD in the form of j-bit word sequence data (j represents a positive integer) are supplied as input data, a random number generator 21, a key data generator 22 operative to supply the random number generator 21 with key data DEY, and an initial value data generator 23 operative to supply the random number generator 21 with initial value data DIT.

In the random number generator 21, a register 25 produces register output data DRZ composed of y-bit words (y represents a positive integer larger than j) in response to input data and supplies a cipher producing portion 26 with the register output data DRZ. The initial value data DIT obtained from the initial value data generator 23 are supplied to the register 25.

In the cipher producing portion 26 to which the key data DEY obtained from the key data generator 22 are also supplied, the register output data DRZ obtained from the register 25 are subjected to enciphering process in accordance with the rules determined by the key data DEY to produce cipher data DEZ composed of y-bit words. The cipher data DEZ are sent from the cipher producing portion 26 to a bit extracting portion 27. In the bit extracting portion 27, j bits of each of the y-bit words constituting the cipher data DEZ are extracted successively to produce pseudo-random number data DXA composed of j-bit words. The pseudo-random number data DXA obtained from the bit extracting portion 27 are sent from the random number generator 21 to be supplied to the enciphering portion 20.

Incidentally, the random number generator 21 may produce genuine random number data in place of the pseudo-random number data DXA. In such a case, the genuine random number data are sent from the random number generator 21 to be supplied to the enciphering portion 20.

In the enciphering portion 20, the digital information data DOD are subjected to enciphering process responding to the pseudo-random number data DXA or the genuine random number data obtained from the random number generator 21 to produce enciphered digital information data DXD in the form of j-bit word sequence data. The enciphered digital information data DXD thus obtained on the basis of the digital information data DOD are sent from the enciphering portion 20.

The enciphered digital information data DXD sent from the enciphering portion 20 are supplied to a bit number converting portion 28 in the random number generator 21. In the bit number converting portion 28, the enciphered digital information data DXD are converted to feedback data DFD in the form of y-bit word sequence data. The feedback data DFD obtained from the bit number converting portion 28 are fed back to the register 25 as the input data.

The register 25 is operative first to send the register output data DRZ obtained in response to the initial value data DIT obtained from the initial value data generator 23 and then to send the register output data DRZ obtained in response to the feedback data DFD obtained from the bit number converting portion 28.

The deciphering circuit shown in FIG. 6 is constituted with a deciphering portion 30 to which the enciphered digital information data DXD in the form of j-bit word sequence data obtained from the enciphering circuit shown in FIG. 5 are supplied as input data, a random number generator 31, a key data generator 32 operative to supply the random number generator 31 with key data DEY, and an initial value data generator 33 operative to supply the random number generator 31 with initial value data DIT.

The random number generator 31 is constituted with a register 25, a cipher producing portion 26, a bit extracting portion 27 and a bit number converting portion 28, in almost the same manner as the random number generator 21 shown in FIG. 5, to supply the deciphering portion 30 with pseudo-random number data DXA. However, the enciphered digital information data DXD which are supplied to the deciphering portion 30 are supplied to the bit number converting portion 28. The key data generator 32 and the initial value data generator 33 correspond to the key data generator 22 and the initial value data generator 23 shown in FIG. 5, respectively.

Incidentally, the random number generator 31 may produce genuine random number data in place of the pseudo-random number data DXA. In such a case, the genuine random number data are sent from the random number generator 31 to be supplied to the deciphering portion 30.

In the deciphering portion 30, the enciphered digital information data DXD are subjected to deciphering process in response to the pseudo-random number data DXA or the genuine random number data obtained from the random number generator 31 to reproduce the original digital information data DOD. The reproduced digital information data DOD thus obtained on the basis of the enciphered digital information data DXD are sent from the deciphering portion 30.

Supposing that difficulty in deciphering enciphered digital information data which are obtained by subjecting digital information data to enciphering process is referred to cipher strength, the larger the cipher strength is, the more it is desirable in cipher-transmission of the digital information data for the purpose of enciphering.

In the case where the enciphering circuit shown in FIG. 5 is used for enciphering digital information data, the cipher strength is influenced by the pseudo-random number data DXA or the genuine random number data obtained from the random number generator 21 to be supplied to the enciphering portion 20 and, more particularly, by the cipher data DEZ sent from the cipher producing portion 26 in the random number generator 21. The cipher data DEZ sent from the cipher producing portion 26 is produced in the basis of the register output data DRZ obtained from the register 25.

The initial value data DIT supplied to the register 25 are fixed without any changes and this fact deteriorates undesirably the cipher strength. That is, it is not so difficult to clarify the contents of the initial value data DIT which are fixed without any changes and, if the contents of the initial value data DIT are once clarified, the register output data DRZ supplied to the cipher producing portion 26 and the cipher data DEZ obtained from the cipher producing portion 26 are also clarified based on the enciphered digital information data DXD obtained from the enciphering portion 20, so that possibility of clarification upon the contents of the key data DEY obtained from the key data generator 22 is increased to bring about deteriorations in the cipher strength of the enciphered digital information data DXD.

The cipher producing portion 26 is constituted with, for example, a plurality of working steps 1 to N (N is an integer larger than 1) accompanied with registers 1 to N, respectively, and connected in series, in which the register output data DRZ obtained from the register 25 are supplied to the working step 1 and the cipher data DEZ are obtained from the register N, as shown in FIG. 7. When the register output data DRZ obtained from the register 25 are supplied to the working step 1, the procedures in the working steps 1 to N are successively carried out with every working clock and N working clocks are necessary for obtaining the cipher data DEZ based on the register output data DRZ from the register N. This means that there is a delay time corresponding to N working clocks periods between a time point at which the register output data DRZ obtained from the register 25 are supplied to the working step 1 and a time point at which the cipher data DEZ based on the register output data DRZ are obtained from the register N.

During the delay time corresponding to N working clocks periods, which is the time from the time point at which the register output data DRZ obtained from the register 25 are supplied to the working step 1 to the time point at which the cipher data DEZ based on the register output data DRZ are obtained from the register N, the cipher data DEZ based on the register output data DRZ are not obtained but data which are varied from initial value data common to the registers 1 to N by the procedures in the working steps 1 to N are successively obtained from the cipher producing portion 26. Under such a situation, since the algorism of the operation in the cipher producing portion 26 are usually opened to the public, it is easy to clarify the contents of data obtained from the cipher producing portion 26 during the time from the time point at which the register output data DRZ obtained from the register 25 are supplied to the working step 1 to the time point at which the cipher data DEZ based on the register output data DRZ are obtained from the register N if the contents of the initial value data common to the registers 1 to N are known.

Therefore, if the cipher producing portion 26 in the random number generator 21 starts operating when the digital information data DOD are commenced to be supplied to the enciphering portion 20 to produce the enciphered digital information data DXD, it is feared that the contents of the data obtained from the cipher producing portion 26 are clarified based on the enciphered digital information data DXD obtained from the enciphering portion 20 during a time from a time point at which the cipher producing portion 26 starts operating to a time point at which the time corresponding P-1 working clock periods elapses and consequently possibility of clarification upon the contents of the key data DEY obtained from the key data generator 22 is increased to bring about deteriorations in the cipher strength of the enciphered digital information data DXD.

Accordingly, it is an object of the present invention to provide an apparatus for enciphering data in which digital information data, such as an HD signal which is obtained by subjecting an HD-SDI signal to S/P conversion, are subjected to enciphering process in response to random number data or pseudo-random number data produced on the basis of key data to produce enciphered digital information data, and by which the cipher strength of the enciphered digital information data can be surely improved.

Another object of the present invention is to provide an apparatus for deciphering data by which enciphered digital information data which are obtained by subjecting digital information data to such enciphering process as to produce enciphered data having the improved cipher strength can be subjected to deciphering process to reproduce the original digital information data, such as an HD signal which is obtained by subjecting an HD-SDI signal to S/P conversion.

DISCLOSURE OF THE INVENTION

According to the invention claimed in any one of claims 1 to 5 of the present application, there is provided an apparatus for enciphering data, which comprises a cipher producing portion for subjecting input data to enciphering process in accordance with rules determined by key data to produce cipher data, an enciphering portion for subjecting digital information data to enciphering process responding to random number data or pseudo-random number data produced on the basis of the cipher data obtained from the cipher producing portion to produce enciphered digital information data, a data supplying portion for producing the input data for the cipher producing portion with initial value data supplied thereto and supplying the cipher producing portion with the produced input data, and an initial value data supplying portion for supplying the data supplying portion with the initial value data in the form of enciphered data.

According to the invention claimed in any one of claims 6 to 8 of the present application, there is provided an apparatus for enciphering data, which comprises a cipher producing portion for subjecting input data to enciphering process in accordance with rules determined by key data to produce cipher data, an enciphering portion for subjecting digital information data to enciphering process responding to random number data or pseudo-random number data produced on the basis of the cipher data obtained from the cipher producing portion to produce enciphered digital information data, a data supplying portion for producing the input data for the cipher producing portion with initial value data supplied thereto and supplying the cipher producing portion with the produced input data, and a first initial value data supplying portion for supplying the data supplying portion with the initial value data, wherein the cipher producing portion comprises a plurality of working steps each accompanied with a register and connected in series and is provided with a second initial value data supplying portion connected thereto for supplying the registers with initial value data in the form of enciphered data.

According to the invention claimed in any one of claims 9 to 12 of the present application, there is provided an apparatus for enciphering data, which comprises a cipher producing portion for subjecting input data to enciphering process in accordance with rules determined by key data to produce cipher data, an enciphering portion for subjecting digital information data to enciphering process responding to random number data or pseudo-random number data produced on the basis of the cipher data obtained from the cipher producing portion to produce enciphered digital information data, a data supplying portion for producing the input data for the cipher producing portion with initial value data supplied thereto and supplying the cipher producing portion with the produced input data, and an initial value data supplying portion for supplying the data supplying portion with the initial value data, wherein the cipher producing portion comprises a plurality of working steps each accompanied with a register and connected in series and is provided with a controlling portion connected thereto for causing the cipher producing portion to start operating at a particular time point earlier at least by a time corresponding to delay in operation of the working steps than a time point at which the digital information data are commenced to be supplied to the enciphering portion.

According to the invention claimed in any one of claims 13 to 17 of the present application, there is provided an apparatus for deciphering data, which comprises a cipher producing portion for subjecting input data to enciphering process in accordance with rules determined by key data to produce cipher data, a deciphering portion for subjecting enciphered digital information data to deciphering process responding to random number data or pseudo-random number data produced on the basis of the cipher data obtained from the cipher producing portion to reproduce original digital information data, a data supplying portion for producing the input data for the cipher producing portion with initial value data supplied thereto and supplying the cipher producing portion with the produced input data, and an initial value data supplying portion for supplying the data supplying portion with the initial value data in the form of enciphered data.

According to the invention claimed in any one of claims 18 to 20 of the present application, there is provided an apparatus for deciphering data, which comprises a cipher producing portion for subjecting input data to enciphering process in accordance with rules determined by key data to produce cipher data, a deciphering portion for subjecting enciphered digital information data to deciphering process responding to random number data or pseudo-random number data produced on the basis of the cipher data obtained from the cipher producing portion to reproduce original digital information data, a data supplying portion for producing the input data for the cipher producing portion with initial value data supplied thereto and supplying the cipher producing portion with the produced input data, and a first initial value data supplying portion for supplying the data supplying portion with the initial value data, wherein the cipher producing portion comprises a plurality of working steps each accompanied with a register and connected in series and is provided with a second initial value data supplying portion connected thereto for supplying the registers with initial value data in the form of enciphered data.

According to the invention claimed in any one of claims 21 to 24 of the present application, there is provided an apparatus for deciphering data, which comprises a cipher producing portion for subjecting input data to enciphering process in accordance with rules determined by key data to produce cipher data, a deciphering portion for subjecting digital information data to deciphering process responding to random number data or pseudo-random number data produced on the basis of the cipher data obtained from the cipher producing portion to reproduce original digital information data, a data supplying portion for producing the input data for the cipher producing portion with initial value data supplied thereto and supplying the cipher producing portion with the produced input data, and an initial value data supplying portion for supplying the data supplying portion with the initial value data, wherein the cipher producing portion comprises a plurality of working steps each accompanied with a register and connected in series and is provided with a controlling portion connected thereto for causing the cipher producing portion to start operating at a particular time point earlier at least by a time corresponding to delay in operation of the working steps than a time point at which the enciphered digital information data are commenced to be supplied to the deciphering portion.

In the apparatus for enciphering data constituted in accordance with the invention claimed in any one of claims 1 to 5 of the present application, the initial value data supplying portion which is operative to supply the initial value data in the form of enciphered data to the data supplying portion for supplying the cipher producing portion with the input data, is provided, and therefore it is extremely difficult to clarify the contents of the initial value data supplied to the data supplying portion. Consequently, possibility of a situation in which the contents of each of the input data supplied to the cipher producing portion and the cipher data obtained from the cipher producing portion are clarified based on the enciphered digital information data obtained from the enciphering portion and as a result the contents of the key data are clarified, is effectively reduced so that the cipher strength of the enciphered digital information data is improved.

In the apparatus for enciphering data constituted in accordance with the invention claimed in any one of claims 6 to 8 of the present application, the initial value data supplying portion which is operative to supply the initial value data in the form of enciphered data to the registers in the cipher producing portion comprising a plurality of working steps each accompanied with the register and connected in series for processing the input data and operative to produce the cipher data which is used for supplying the enciphering portion for producing the enciphered digital information data with the pseudo-random number data or random number data, is provided, and therefore it is extremely difficult to clarify the contents of the initial value data supplied to the registers in the cipher producing portion. Consequently, it is difficult to clarify the contents of the cipher data obtained from the cipher producing portion and possibility of a situation in which the contents of the key data are clarified based on the enciphered digital information data obtained from the enciphering portion is effectively reduced so that the cipher strength of the enciphered digital information data is improved.

In the apparatus for enciphering data constituted in accordance with the invention claimed in any one of claims 9 to 12 of the present application, the controlling portion operative to cause the cipher producing portion, which comprises a plurality of working steps connected in series for processing the input data and is operative to produce the cipher data which is based on the key data and used for supplying the enciphering portion for producing the enciphered digital information data with the pseudo-random number data or random number data, to start operating at the particular time point earlier at least by the time corresponding to delay in operation of the working steps than the time point at which the digital information data are commenced to be supplied to the enciphering portion, is provided, and therefore the cipher data are appropriately obtained from the cipher producing portion and the pseudo-random number data or random number data are appropriately supplied to the enciphering portion when the digital information data are commenced to be supply to the enciphering portion. Consequently, possibility of a situation in which the contents of the cipher data obtained from the cipher producing portion are clarified based on the enciphered digital information data obtained from the enciphering portion during the time from the time point at which the cipher producing portion starts operating to the time point at which the time corresponding to delay in operation of the working steps in the cipher producing portion elapses is effectively reduced so that the cipher strength of the enciphered digital information data is improved.

In the apparatus for deciphering data constituted in accordance with the invention claimed in any one of claims 13 to 24 of the present application, the initial value data supplying portion which is operative to supply the initial value data in the form of enciphered data to the data supplying portion for supplying the cipher producing portion with the input data, the initial value data supplying portion which is operative to supply the initial value data in the form of enciphered data to the registers in the cipher producing portion comprising a plurality of working steps each accompanied with the register and connected in series for processing the input data and operative to produce the cipher data which is used for supplying the deciphering portion for subjecting the enciphered digital information data to the deciphering process with the pseudo-random number data or random number data, or the controlling portion operative to cause the cipher producing portion, which comprises a plurality of working steps connected in series for processing the input data and is operative to produce the cipher data which is based on the key data and used for supplying the deciphering portion for subjecting the enciphered digital information data to the deciphering process with the pseudo-random number data or random number data, to start operating at the particular time point earlier at least by the time corresponding to delay in operation of the working steps than the time point at which the enciphered digital information data are commenced to be supplied to the deciphering portion, is provided, and therefore the deciphering process by which the enciphered digital information data, which are obtained by subjecting digital information data to such enciphering process as to produce enciphered data having the improved cipher strength, is subjected to the deciphering process to reproduce the original digital information data, is surely and appropriately carried out.

BRIEF DESCRIPTION OF THE DRAWINGS

FIGS. 2A and 2B are illustrations used for explaining an example of data format of an HD signal;

EMBODIMENTS MOST PREFERABLE FOR WORKING OF THE INVENTION

Figure 8:
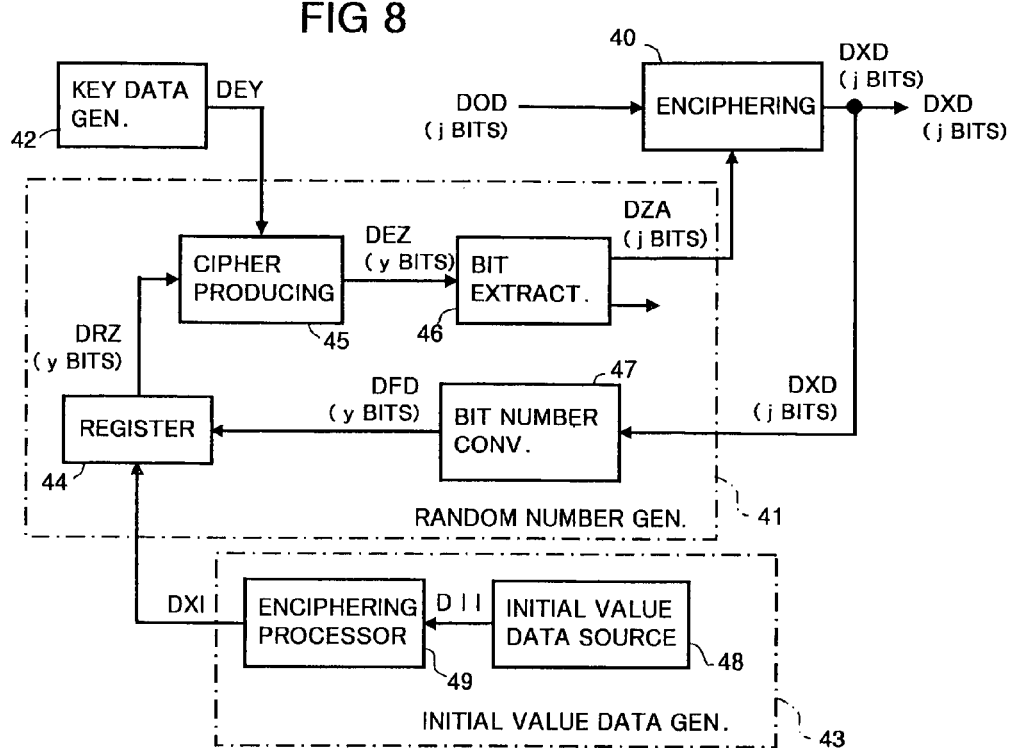
FIG. 8 is a schematic block diagram showing an embodiment of apparatus for deciphering data according to the invention claimed in claim 1 or 2 of the present application.

FIG. 8 shows an embodiment of apparatus for enciphering data according to the invention claimed in claim 1 or 2.

The embodiment shown in FIG. 8 is constituted with an enciphering portion 40 to which digital information data DOD in the form of j-bit word sequence data are supplied as input data, a random number generator 41, a key data generator 42 constituting a key data supplying portion operative to supply the random number generator 41 with key data DEY and an initial value data generator 43 constituting an initial value data supplying portion operative to supply the random number generator 41 with initial value data DXI.

In the random number generator 41, a register 44 is provided to constitute a data supplying portion for producing register output data DRZ composed of y-bit words in response to input data and supplying a cipher producing portion 45 with the register output data DRZ. The initial value data DXI obtained from the initial value data generator 43 are supplied to the register 44.

The key data DEY obtained from the key data generator 42 are supplied to the cipher producing portion 45 in the random number generator 41. The cipher producing portion 45 is operative to subject the register output data DRZ, which are supplied to the cipher producing portion 45 as input data, to enciphering process in accordance with rules determined by the key data DEY to produce cipher data DEZ composed of y-bit words. The cipher data DEZ thus obtained from the cipher producing portion 45 are supplied to a bit extracting portion 46.

The bit extracting portion 46 is operative to extract j bits of each of the y-bit words constituting the cipher data DEZ to produce pseudo-random number data DZA composed of j-bit words. The pseudo-random number data DZA obtained from the bit extracting portion 46 are sent from the random number generator 41 to be supplied to the enciphering portion 40.

The initial value data generator 43 is constituted with an initial value data source 48 from which predetermined data DII for initial value are obtained and an enciphering processor 49 operative to subject the data DII for initial value obtained from the initial value data source 48 to enciphering process to produce the initial value data DXI and send the initial value data DXI in the form of enciphered data. Therefore, the initial value data DXI in the form of enciphered data are supplied to the register 44 from the initial value data generator 43.

Incidentally, the random number generator 41 may produce random number data (genuine random number data) in place of the pseudo-random number data DZA. In such a case, the random number data are sent from the random number generator 41 to be supplied to the enciphering portion 40.

The enciphering portion 40 is operative to subject the digital information data DOD to enciphering process responding to the pseudo-random number data DZA or the random number data obtained from the random number generator 41 to produce enciphered digital information data DXD in the form of j-bit word sequence data based on the digital information data DOD.

The enciphered digital information data DXD sent from the enciphering portion 40 are supplied to a bit number converting portion 47 in the random number generator 41. In the bit number converting portion 47, the enciphered digital information data DXD is converted to feedback data DFD in the form of y-bit word sequence data. The feedback data DFD obtained from the bit number converting portion 47 are fed back to the register 44.

The register 44 is operative first to send the register output data DRZ obtained in response to the initial value data DXI obtained from the initial value data generator 43 and then to send the register output data DRZ obtained in response to the feedback data DFD obtained from the bit number converting portion 47.

Figure 9:
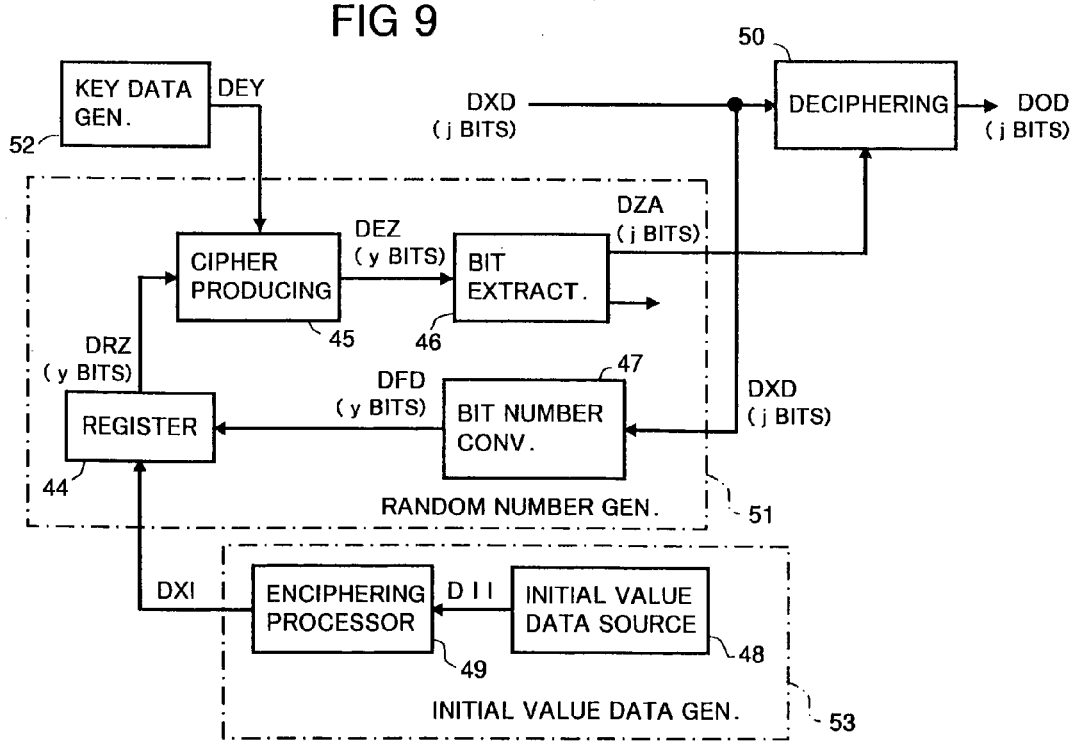
FIG. 9 is a schematic block diagram showing an embodiment of apparatus for deciphering data according to the invention claimed in claim 13 or 14 of the present application.

FIG. 9 shows an embodiment of apparatus for deciphering data according to the invention claimed in claim 13 or 14. This embodiment is used for subjecting the enciphered digital information data obtained from the apparatus for enciphering data shown in FIG. 8 to deciphering process to reproduce the original digital information data.

The embodiment shown in FIG. 9 is constituted with a deciphering portion 50 to which the enciphered digital information data DXD in the form of j-bit word sequence data produced in the embodiment of apparatus for enciphering data shown in FIG. 8, is supplied as input data, a random number generator 51, a key data generator 52 constituting a key data supplying portion operative to supply the random number generator 51 with key data DEY and an initial value data generator 53 constituting an initial value supplying portion operative to supply the random number generator 51 with initial value data DXI.

The random number generator 51 is constituted with a cipher producing portion 45, a register 44 constituting a data supplying portion for supplying the cipher producing portion 45 with input data, a bit extracting portion 46 and a bit number converting portion 47, in the same manner as the random number generator 41 shown in FIG. 8, and operative to supply the deciphering portion 50 with pseudo-random number data DZA composed of j-bit words. However, the enciphered digital information data DXD supplied to the deciphering portion 50 are supplied to the bit number converting portion 47 in the random number generator 41 and output data (DFD) obtained from the bit number converting portion 47 are supplied to the register 44 as input data from the outside.

Figure 1:
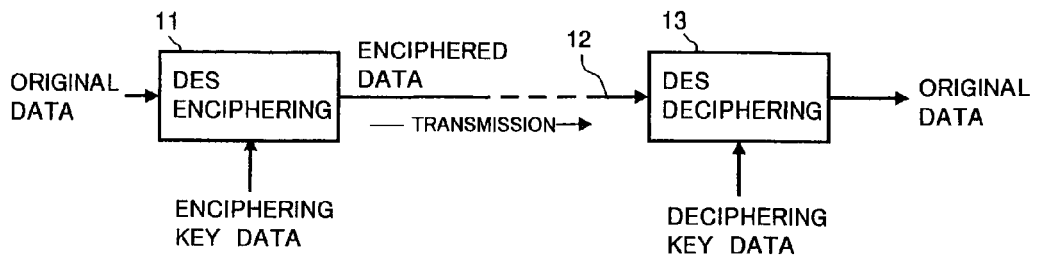
FIG. 1 is a schematic block diagram showing a basic structure of a cipher-transmission system according to the DES.
Figure 4:
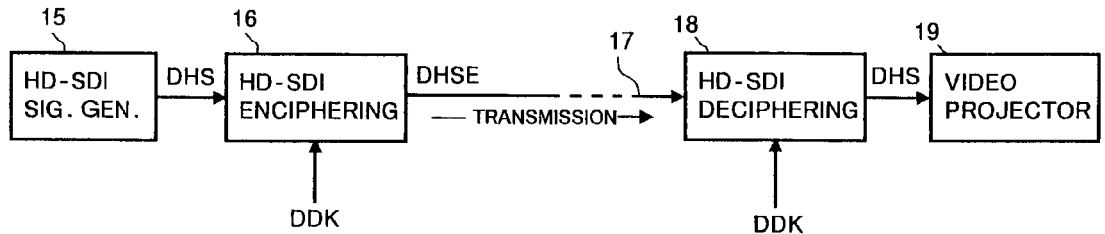
FIG. 4 is a schematic block diagram showing a cipher-transmission system which can be used for the cipher-transmission of an HD-SDI signal.
Figure 5:
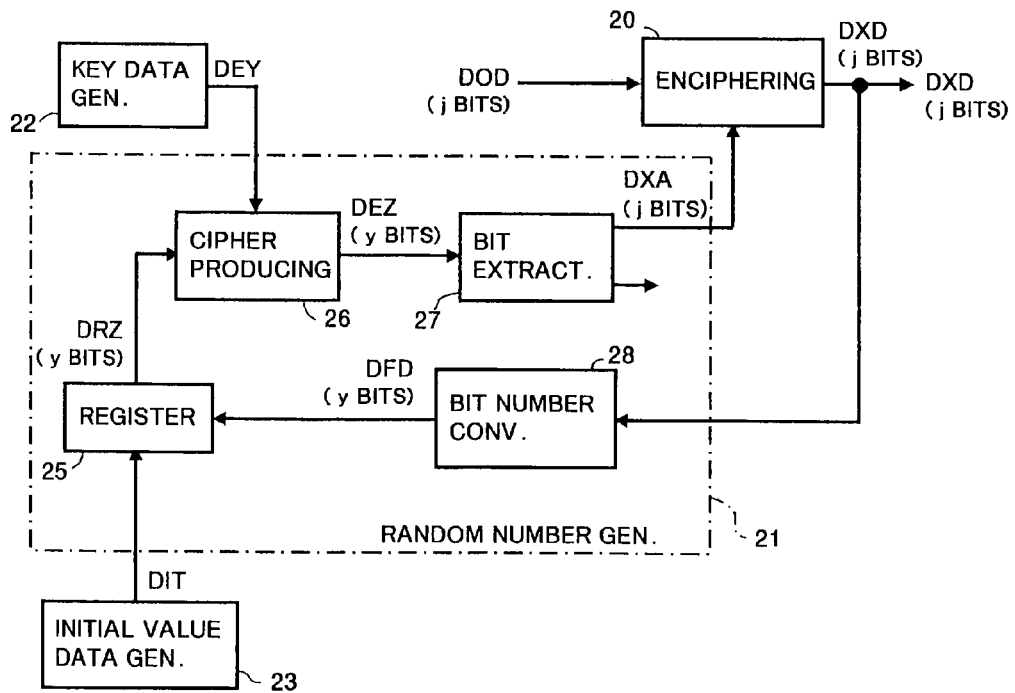
FIG. 5 is a schematic block diagram showing an example of an enciphering circuit which can be used for subjecting a video data portion of an HD signal to enciphering process in accordance with rules determined by enciphering key data.
Figure 3:
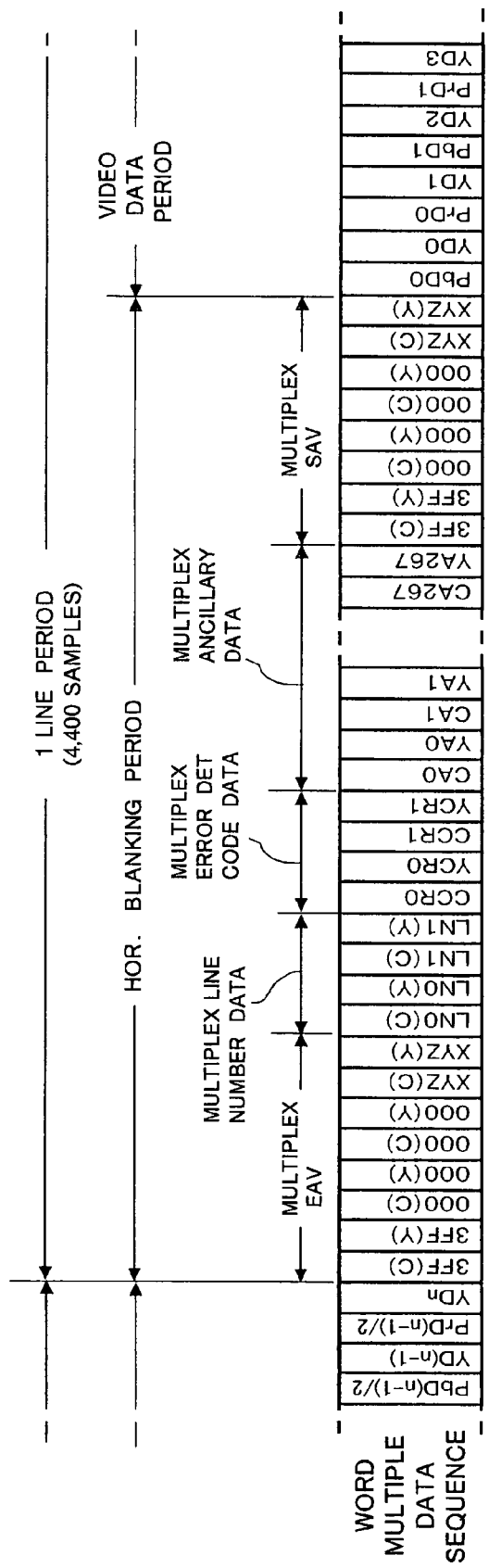
FIG. 3 is an illustration used for explaining another example of data format of an HD signal.
Figure 6:
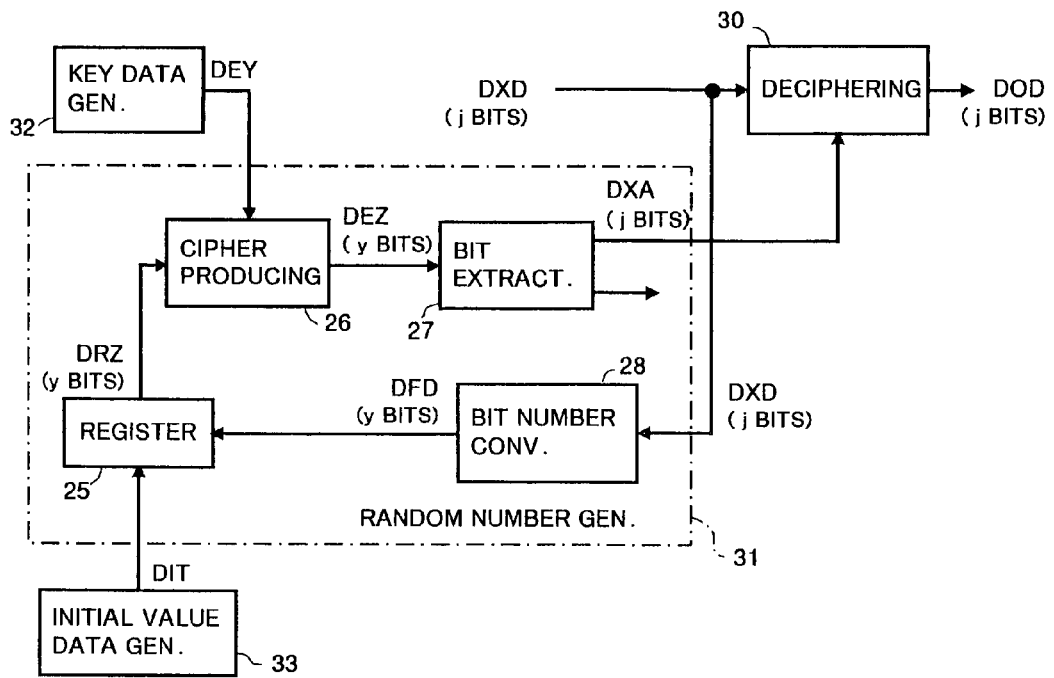
FIG. 6 is a schematic block diagram showing an example of a deciphering circuit which can be used for subjecting a video data portion of an enciphered HD signal to deciphering process in accordance with rules determined by deciphering key data.
Figure 7:
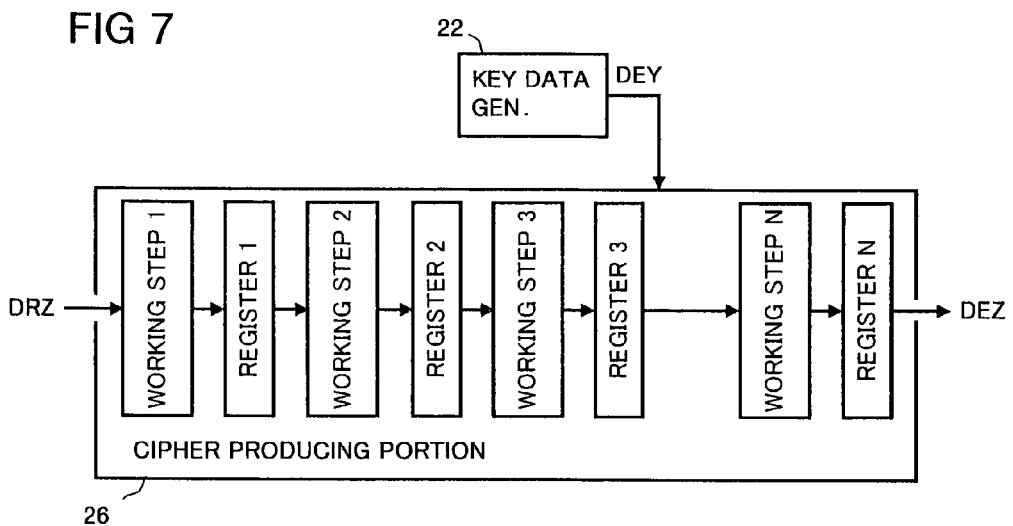
FIG. 7 is a schematic block diagram showing an example of an embodied structure of the enciphering circuit shown in FIG. 5.

The key data generator 52 and the initial value data generator 53 are provided in the same manner as the key data generator 42 and the initial value data generator 43 shown in FIG. 3, and the initial value data generator 53 is constituted with an initial value data source 48 and an enciphering processor 49. Accordingly, in the embodiment shown in FIG. 9 also, the initial value data DXI in the form of enciphered data are supplied to the register 44 from the initial value data generator 53.

Incidentally, the random number generator 51 may produce random number data (genuine random number data) in place of the pseudo-random number data DZA. In such a case, the random number data are sent from the random number generator 51 to be supplied to the deciphering portion 40.

Under such a situation as mentioned above, the deciphering portion 50 is operative to subject the enciphered digital information data DXD to deciphering process responding to the pseudo-random number data DZA or the random number data obtained from the random number generator 41 to reproduce the original digital information data DOD to be sent therefrom.

Figure 10:
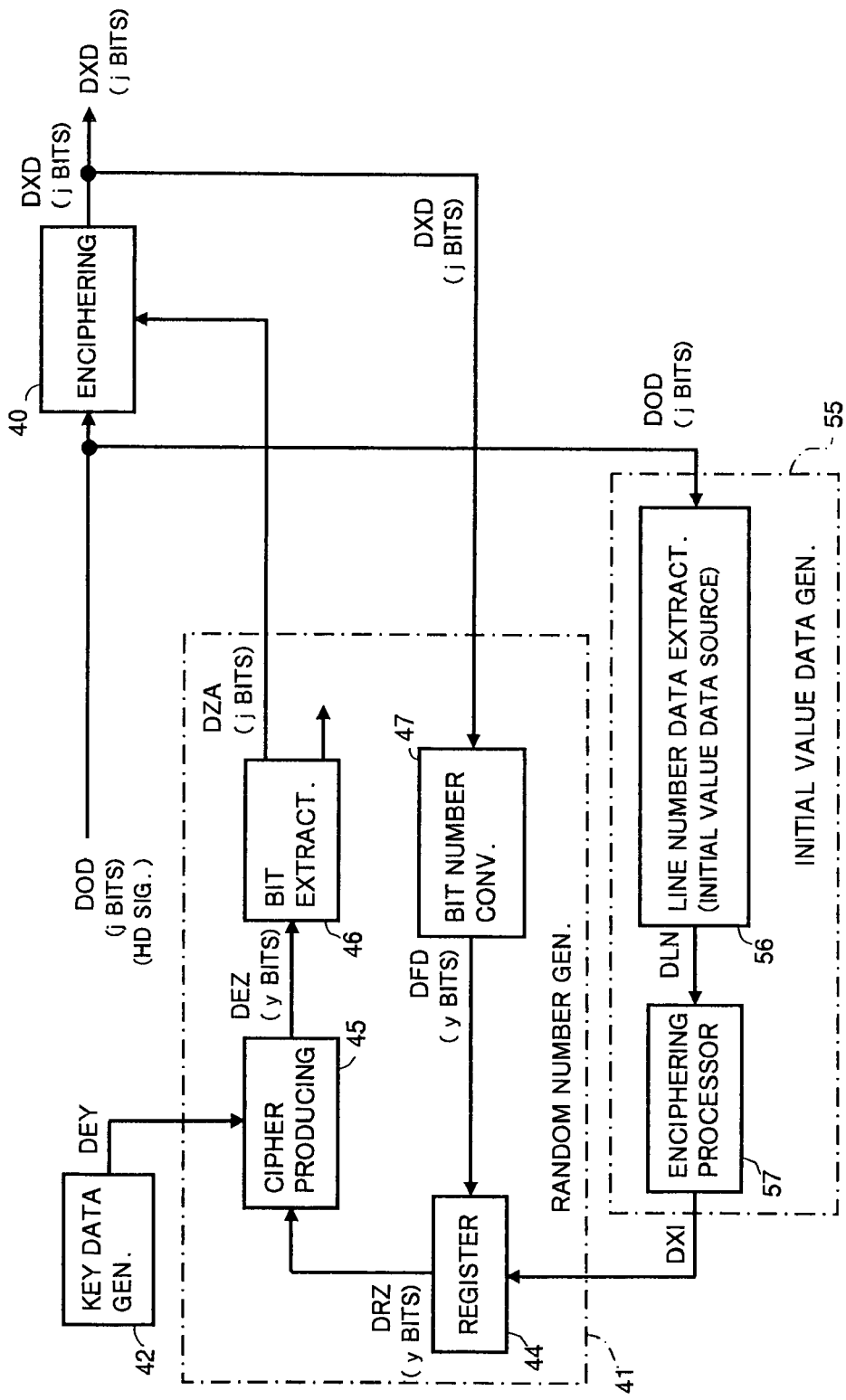
FIG. 10 is a schematic block diagram showing an embodiment of apparatus for enciphering data.

FIG. 10 shows an embodiment of apparatus for enciphering data according to the invention claimed in any one of claims 1 to 4.

The embodiment shown in FIG. 10 corresponds to a variation obtained by replacing the initial value data generator 43 in the embodiment shown in FIG. 8 with an initial value data generator 55. In FIG. 10, circuit blocks, signals and data corresponding to those of FIG. 8 are marked with the same references and further description thereof will be omitted.

In the embodiment shown in FIG. 10, an HD signal which is obtained by subjecting an HD-SDI signal to S/P conversion is supplied to an enciphering portion 40 as digital information data DOD in the form of j-bit word sequence data. The HD signal as the digital information data DOD is further supplied to the initial value data generator 55.

The initial value data generator 55 is constituted with a line number data extracting portion 56 constituting an initial value data source and an enciphering processor 57. The line number data extracting portion 56 is operative to extract line number data from a portion corresponding to each blanking period of the HD signal supplied thereto as the digital information data DOD and supply the enciphering processor 57 with the extracted line number data as data DLN. The enciphering processor 57 is operative to subject the data DLN to enciphering process to produce initial value data DXI and send the initial value data DXI in the form of enciphered data.

The initial value data DXI sent from the enciphering processor 57 are supplied to a register 44 in a random number generator 41 from the initial value data generator 55. Accordingly, the initial value data DXI in the form of enciphered data based on the line number data contained in the portion corresponding to each line blanking period of the HD signal are supplied to the register 44 in the random number generator 41. The line number data varies line by line in the HD signal so as to represent a line number of each of lines constituting each frame of the HD signal and therefore the initial value data DXI in the form of enciphered data vary also in response to variations in the line number data.

The random number generator 41 is operative to supply the enciphering portion 40 with pseudo-random number data DZA or random number data in place of the pseudo-random number data DZA when the initial value data DXI obtained from the enciphering processor 57 as mentioned above are supplied to the register 44.

The enciphering portion 40 is operative to subject video data portions provided to be successive to the portions each corresponding to the line blanking period of the HD signal as the digital information data DOD to enciphering process responding to the pseudo-random number data DZA or the random number data obtained from the random number generator 41 to produce enciphered digital information data DXD in the form of j-bit word sequence data, which contain enciphered video data and various data provided in the portion corresponding to each line blanking period of the HD signal, to be sent therefrom.

Figure 11:
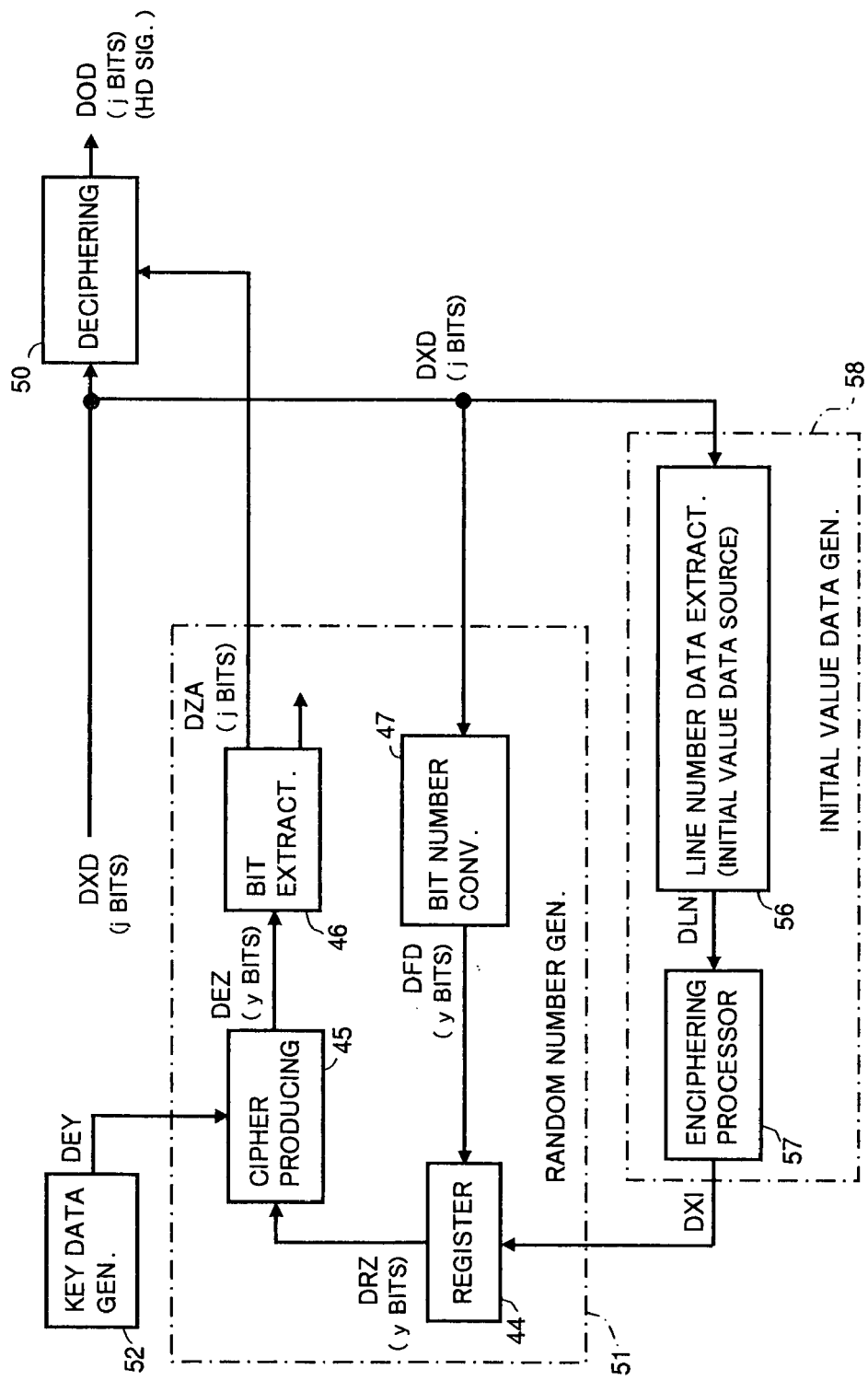
FIG. 11 is a schematic block diagram showing an embodiment of apparatus for deciphering data.

FIG. 11 shows an embodiment of apparatus for deciphering data according to the invention claimed in any one of claims 13 to 16. This embodiment is used for subjecting the enciphered digital information data obtained from the apparatus for enciphering data shown in FIG. 10 to deciphering process to reproduce the original HD signal as the original digital information data.

The embodiment shown in FIG. 11 corresponds to a variation obtained by replacing the initial value data generator 53 in the embodiment shown in FIG. 9 with an initial value data generator 58. In FIG. 11, circuit blocks, signals and data corresponding to those of FIG. 9 are marked with the same references and further description thereof will be omitted.

In the embodiment shown in FIG. 11, the enciphered digital information data DXD in the form of j-bit word sequence data, which contain the enciphered video data and various data provided in the portion corresponding to each line blanking period of the HD signal, are supplied to a deciphering portion 50. This enciphered digital information data DXD are further supplied to the initial value data generator 58 in addition to a bit number converting portion 47 in a random number generator 51.

The initial value data generator 58 is constituted with a line number data extracting portion 56 constituting an initial value data source and an enciphering processor 57 in the same manner as the initial value data generator 55 shown in FIG. 10. The line number data extracting portion 56 is operative to extract line number data from the portion corresponding to each line blanking period of the HD signal contained in the enciphered digital information data DXD and supply the enciphering processor 57 with the extracted line number data as data DLN. The enciphering processor 57 is operative to subject the data DLN to enciphering process to produce initial value data DXI and send the initial value data DXI in the form of enciphered data.

The initial value data DXI sent from the enciphering processor 57 are supplied to a register 44 in a random number generator 51 from the initial value data generator 58. Accordingly, the initial value data DXI in the form of enciphered data based on the line number data contained in the portion corresponding to each line blanking period of the HD signal are supplied to the register 44 in the random number generator 51. The line number data varies line by line in the HD signal so as to represent a line number of each of lines constituting each frame of the HD signal and therefore the initial value data DXI in the form of enciphered data vary also in response to variations in the line number data.

The random number generator 51 is operative to supply the deciphering portion 50 with pseudo-random number data DZA or random number data in place of the pseudo-random number data DZA when the initial value data DXI obtained from the enciphering processor 57 as mentioned above are supplied to the register 44.

The deciphering portion 50 is operative to subject the enciphered video data contained in the enciphered digital information data DXD to deciphering process responding to the pseudo-random number data DZA or the random number data obtained from the random number generator 51 to reproduce the original HD signal as the original digital information data DOD in the form of j-bit word sequence data, which contain the video data and various data provided in the portion corresponding to each line blanking period of the HD signal, to be sent therefrom.

Figure 12:
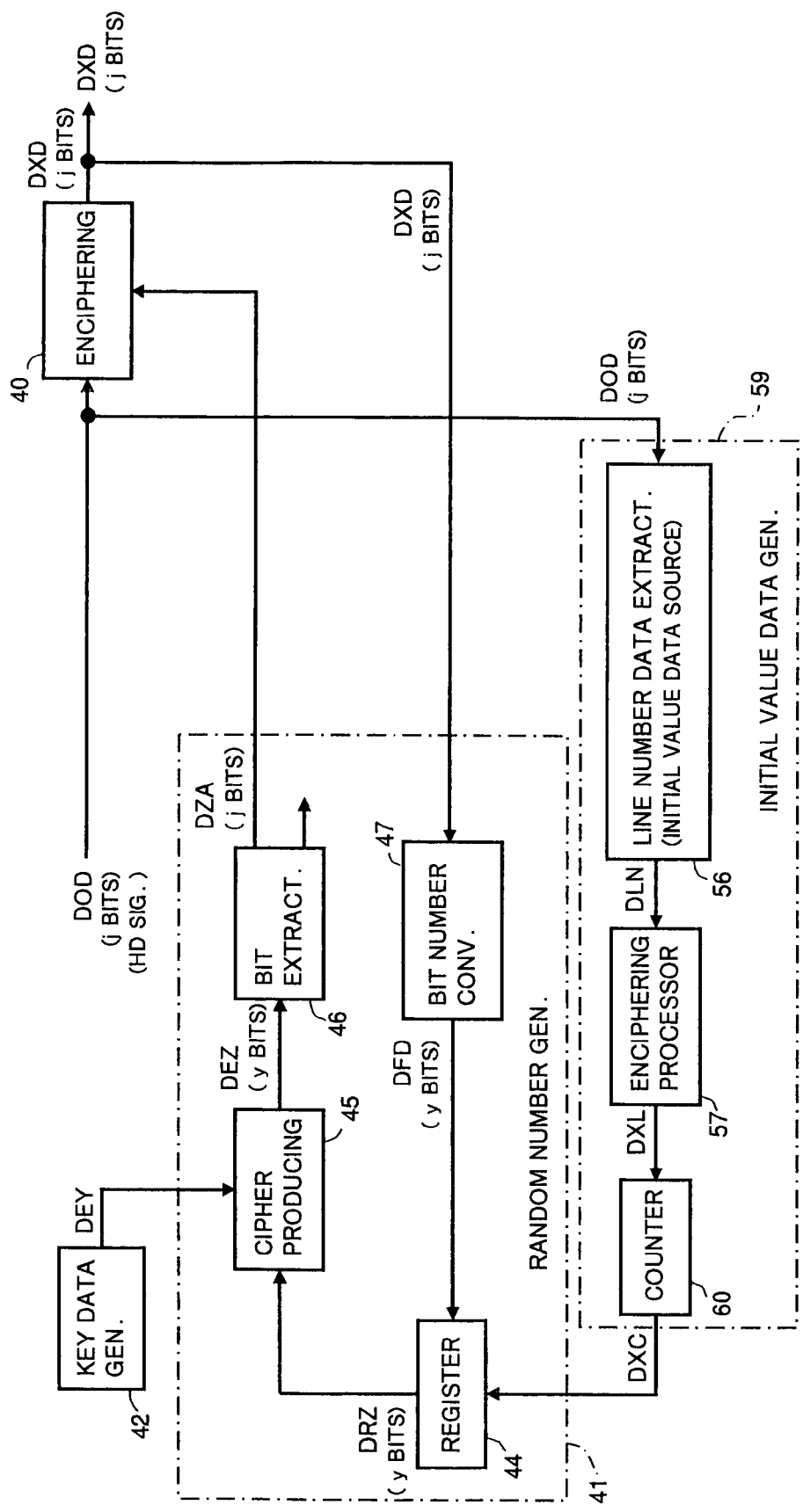
FIG. 12 is a schematic block diagram showing an embodiment of apparatus for enciphering data according to the invention claimed in any one of claims 1 to 5 of the present application.

FIG. 12 shows an embodiment of apparatus for enciphering data according to the invention claimed in any one of claims 1 to 5

The embodiment shown in FIG. 12 corresponds to a variation obtained by replacing the initial value data generator 43 in the embodiment shown in FIG. 8 with an initial value data generator 59. In FIG. 12, circuit blocks, signals and data corresponding to those of FIG. 8 are marked with the same references and further description thereof will be omitted.

In the embodiment shown in FIG. 12, an HD signal which is obtained by subjecting an HD-SDI signal to S/P conversion is supplied to an enciphering portion 40 as digital information data DOD in the form of j-bit word sequence data. The HD signal as the digital information data DOD is further supplied to the initial value data generator 59.

The initial value data generator 59 is constituted with a line number data extracting portion 56 constituting an initial value data source, an enciphering processor 57 and a counter 60. The line number data extracting portion 56 is operative to extract line number data from a portion corresponding to each blanking period of the HD signal supplied thereto as the digital information data DOD and supply the enciphering processor 57 with the extracted line number data as data DLN. The enciphering processor 57 is operative to subject the data DLN to enciphering process to produce enciphered line number data DXL and supply the counter with the enciphered line number data DXL. The counter 60 causes the enciphered line number data DXL to vary successively with its counting operation and send the enciphered line number data DXL varying successively as initial value data DXC in the form of enciphered data.

The initial value data DXC sent from the counter 60 are supplied to a register 44 in a random number generator 41 from the initial value data generator 59. Accordingly, the initial value data DXC in the form of enciphered data varying successively and based on the line number data contained in the portion corresponding to each line blanking period of the HD signal are supplied to the register 44 in the random number generator 41. The line number data varies line by line in the HD signal so as to represent a line number of each of lines constituting each frame of the HD signal and therefore the initial value data DXC in the form of enciphered data vary also in response to variations in the line number data.

The random number generator 41 is operative to supply the enciphering portion 40 with pseudo-random number data DZA or random number data in place of the pseudo-random number data DZA when the initial value data DXC obtained from the counter 60 as mentioned above are supplied to the register 44.

The enciphering portion 40 is operative to subject video data portions provided to be successive to the portions each corresponding to the line blanking period of the HD signal as the digital information data DOD to enciphering process responding to the pseudo-random number data DZA or the random number data obtained from the random number generator 41 to produce enciphered digital information data DXD in the form of j-bit word sequence data, which contain enciphered video data and various data provided in the portion corresponding to each line blanking period of the HD signal, to be sent therefrom.

Figure 13:
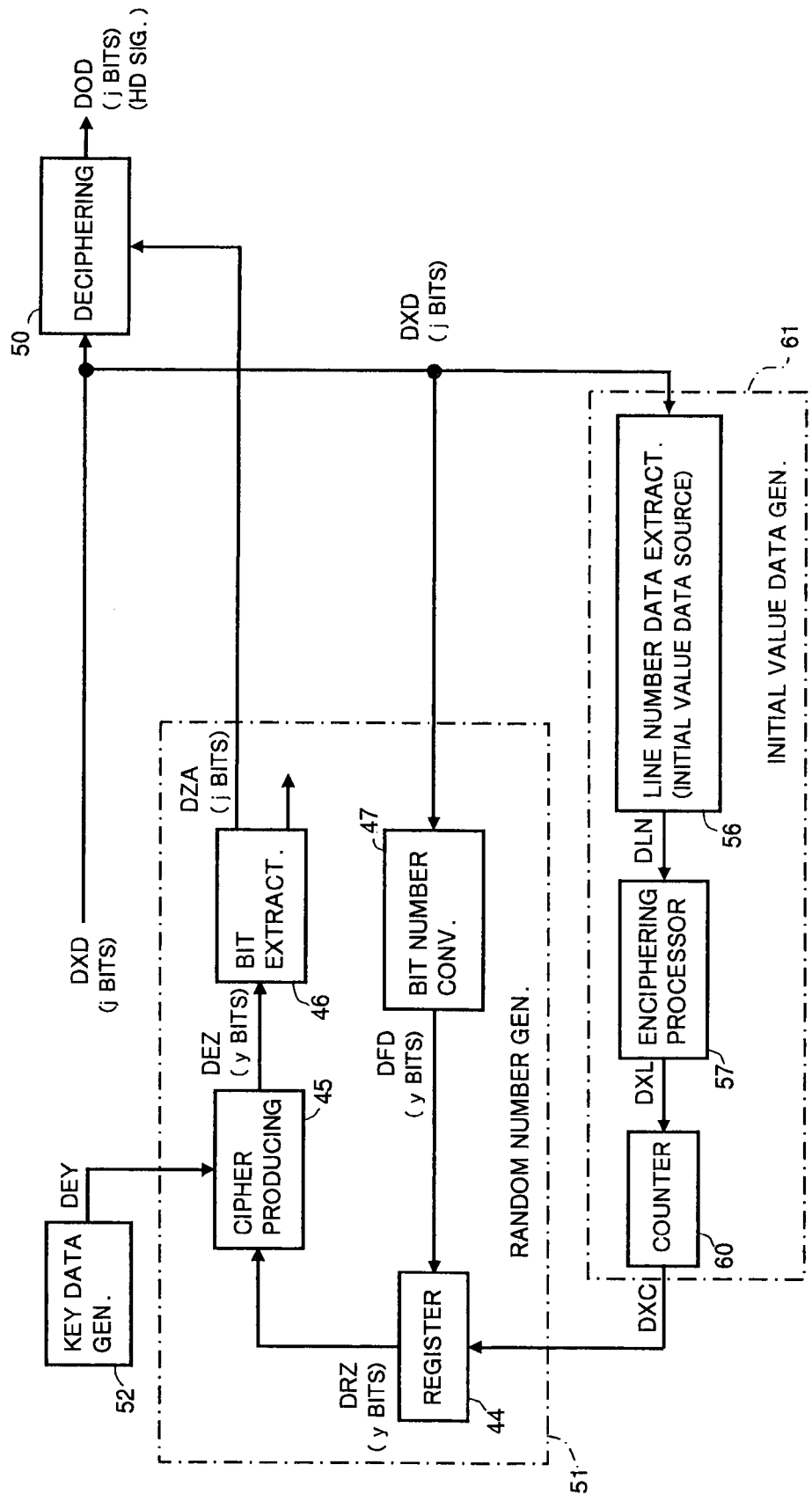
FIG. 13 is a schematic block diagram showing an embodiment of apparatus for deciphering data according to the invention claimed in any one of claims 13 to 17 of the present application.

FIG. 13 shows an embodiment of apparatus for deciphering data according to the invention claimed in any one of claims 13 to 17. This embodiment is used for subjecting the enciphered digital information data obtained from the apparatus for enciphering data shown in FIG. 12 to deciphering process to reproduce the original HD signal as the original digital information data.

The embodiment shown in FIG. 13 corresponds to a variation obtained by replacing the initial value data generator 53 in the embodiment shown in FIG. 9 with an initial value data generator 61. In FIG. 13, circuit blocks, signals and data corresponding to those of FIG. 9 are marked with the same references and further description thereof will be omitted.

In the embodiment shown in FIG. 13, the enciphered digital information data DXD in the form of j-bit word sequence data, which contain the enciphered video data and various data provided in the portion corresponding to each line blanking period of the HD signal, are supplied to a deciphering portion 50. This enciphered digital information data DXD are further supplied to the initial value data generator 61 in addition to a bit number converting portion 47 in a random number generator 51.

The initial value data generator 61 is constituted with a line number data extracting portion 56 constituting an initial value data source, an enciphering processor 57 and a counter 60 in the same manner as the initial value data generator 59 shown in FIG. 12. The line number data extracting portion 56 is operative to extract line number data from the portion corresponding to each line blanking period of the HD signal contained in the enciphered digital information data DXD and supply the enciphering processor 57 with the extracted line number data as data DLN. The enciphering processor 57 is operative to subject the data DLN to enciphering process to produce enciphered line number data DXL and supply the counter 60 with the enciphered line number data DXL. The counter 60 causes the enciphered line number data DXL to vary successively with its counting operation and send the enciphered line number data DXL varying successively as initial value data DXC in the form of enciphered data.

The initial value data DXC sent from the counter 60 are supplied to a register 44 in a random number generator 51 from the initial value data generator 61. Accordingly, the initial value data DXC in the form of enciphered data varying successively and based on the line number data contained in the portion corresponding to each line blanking period of the HD signal are supplied to the register 44 in the random number generator 51. The line number data varies line by line in the HD signal so as to represent a line number of each of lines constituting each frame of the HD signal and therefore the initial value data DXC in the form of enciphered data vary also in response to variations in the line number data.

The random number generator 51 is operative to supply the deciphering portion 50 with pseudo-random number data DZA or random number data in place of the pseudo-random number data DZA when the initial value data DXC obtained from the counter 60 as mentioned above are supplied to the register 44.

The deciphering portion 50 is operative to subject the enciphered video data contained in the enciphered digital information data DXD to deciphering process responding to the pseudo-random number data DZA or the random number data obtained from the random number generator 51 to reproduce the original HD signal as the original digital information data DOD in the form of j-bit word sequence data, which contain the video data and various data provided in the portion corresponding to each line blanking period of the HD signal, to be sent therefrom.

Figure 14:
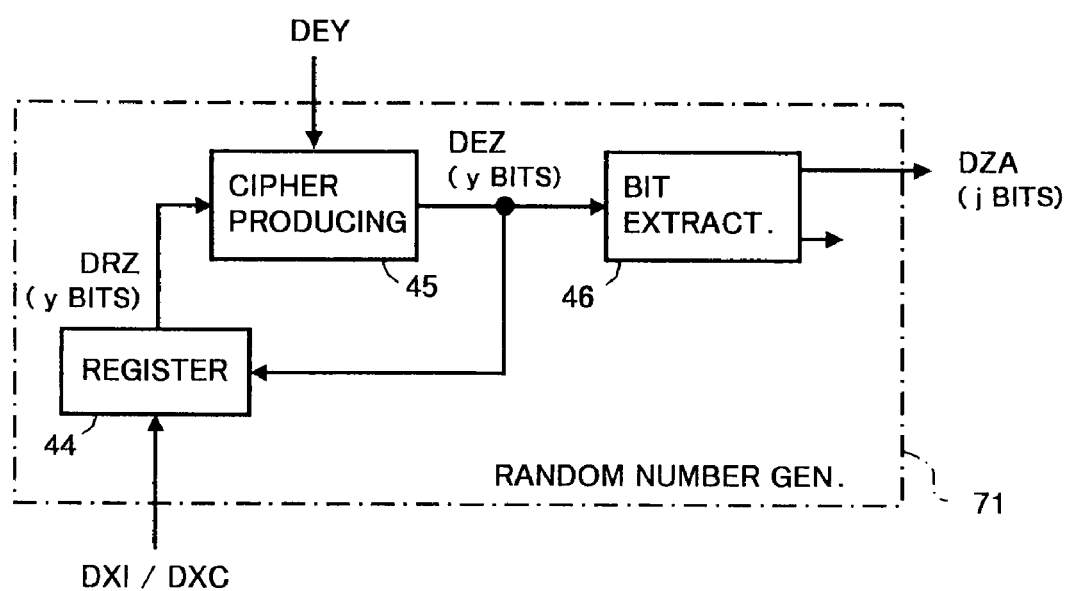
FIG. 14 is a schematic block diagram showing a random number generator which can be used in place of each of the random number generators shown in FIGS. 8, 10 and 12, respectively.

FIG. 14 shows a random number generator 71 which can be used in place of each of the random number generators 41 shown in FIGS. 8, 10 and 12 and the random number generators 51 shown in FIGS. 9, 11 and 13. That is, each of the embodiments of apparatus for enciphering data shown in FIGS. 8, 10 and 12, respectively, can be constituted to include the random number generator 71 in place of the random number generators 41 and each of the embodiments of apparatus for deciphering data shown in FIGS. 9, 11 and 13, respectively, can be constituted to include the random number generator 71 in place of the random number generators 51.

In the random number generator 71 shown in FIG. 14, although a cipher producing portion 45, a register 44 which constitutes a data supplying portion for supplying the cipher producing portion 45 with input data and a bit extracting portion 46 are provided, in the same manner as the situation in each of the random number generators 41 shown in FIGS. 8, 10 and 12 and the random number generators 51 shown in FIGS. 9, 11 and 13, any portion corresponding to the bit number converting portion 47 which is provided in each of the random number generators 41 shown in FIGS. 8, 10 and 12 and the random number generators 51 shown in FIGS. 9, 11 and 13, is not provided. Then, cipher data DEZ obtained from the cipher producing portion 45 are supplied to the bit extracting portion 46 and further supplied to the register 44 as feedback data.

Consequently, the register 44 is operative to send register output data DRZ produced in response to the initial value data DXI or DXC obtained from the initial value data generator 43, 53, 55, 58, 59 or 61 supplied to the register 44 and another register output data DRZ produced in response to the cipher data DEZ obtained from the cipher producing portion 45 which are supplied to the register 44 as feedback data.

In the embodiment of apparatus for enciphering data shown in each of FIGS. 8, 10 or 12, the initial value data supplying portion 43,. 55 or 59 which is operative to supply the initial value data DXI or DXC in the form of enciphered data to the register 44 in the random number generator 41 or 71, is provided, and therefore it is extremely difficult to clarify the contents of the initial value data DXI or DXC supplied to the register 44. Consequently, possibility of a situation in which the contents of each of the register output data DRZ supplied as the input data to the cipher producing portion 45 in the random number generator 41 or 71 and the cipher data DEZ obtained from the cipher producing portion 45 are clarified based on the enciphered digital information data DXD obtained from the enciphering portion 40 and as a result the contents of the key data DEY obtained from the key data generator 42 are clarified, is effectively reduced so that the cipher strength of the enciphered digital information data DXD is improved.

Figure 15:
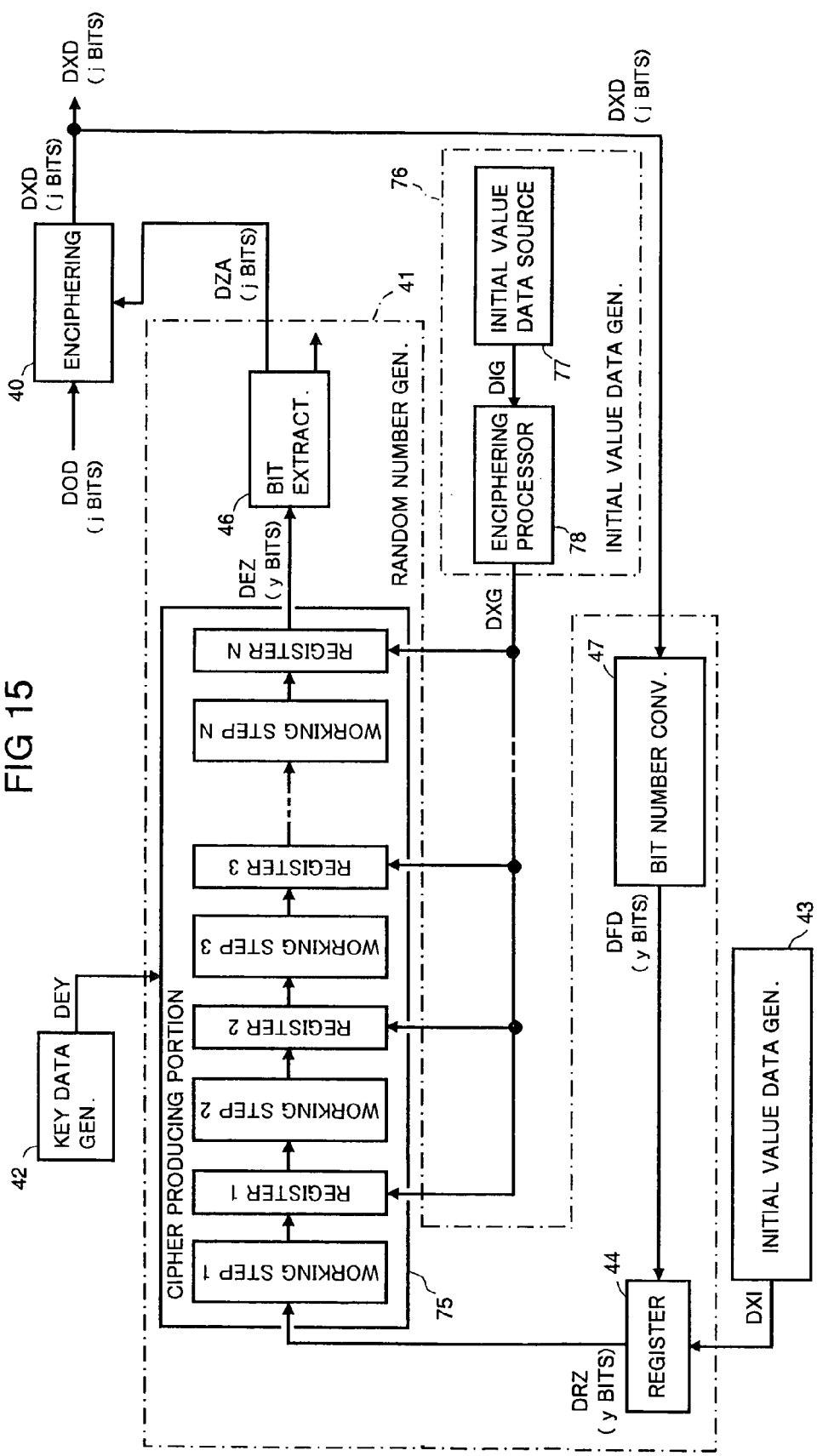
FIG. 15 is a schematic block diagram showing an embodiment of apparatus for enciphering data according to the invention claimed in claim 6 or 7 of the present application.

FIG. 15 shows an embodiment of apparatus for enciphering data according to the invention claimed in claim 6 or 7.

The embodiment shown in FIG. 15 corresponds to a variation obtained by replacing the cipher producing portion 45 in the embodiment shown in FIG. 8 with a cipher producing portion 75 and further adding an initial value data generator 76 to the embodiment shown in FIG. 8. In FIG. 15, circuit blocks, signals and data corresponding to those of FIG. 8 are marked with the same references and further description thereof will be omitted.

In the embodiment shown in FIG. 15, the cipher producing portion 75 is constituted with a plurality of working steps 1 to N accompanied respectively with registers 1 to N and connected in series. Register output data DRZ obtained from a register 44 are supplied to the working step 1 as input data and cipher data DEZ are obtained from the register N. The initial value data generator 76 is constituted with an initial value data source 77 from which predetermined data DIG for initial value are obtained and an enciphering processor 78 operative to subject the data DIG for initial value obtained from the initial value data source 77 to enciphering process to produce the initial value data DXG and send the initial value data DXG in the form of enciphered data.

The initial value data DXG sent from the enciphering processor 78 in the initial value data generator 76 are supplied to each of the registers 1 to N in the cipher producing portion 75. Accordingly, the initial value data DXG in the form of enciphered data are supplied in common to the registers 1 to N in the cipher producing portion 75.

In the cipher producing portion 75, when the register output data DRZ obtained from the register 44 are supplied to the working step 1 as input data, the processing operations to the register output data DRZ in each of the working steps 1 to N are successively carried out at every working clock and the cipher data DEZ based on the register output data DRZ are obtained from the register N. Each of the registers 1 to N operates with the initial value data DXG in the form of enciphered data supplied thereto. The cipher data DEZ obtained from the register N in the cipher producing portion 75 are supplied to a bit extracting portion 46.

Other operations of the embodiment shown in FIG. 15 are performed in the same manner as those of the embodiment shown in FIG. 8.

Figure 16:
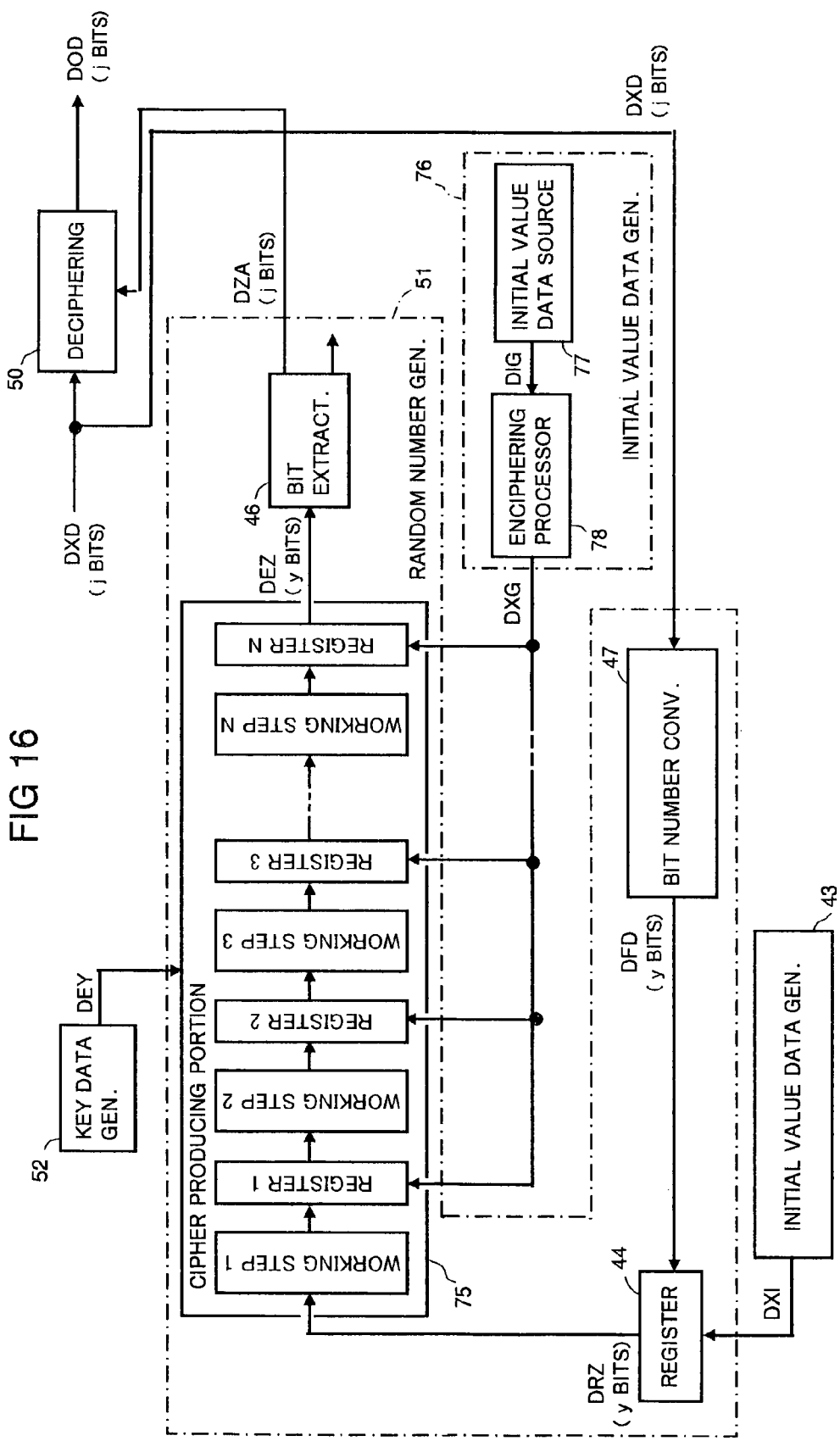
FIG. 16 is a schematic block diagram showing an embodiment of apparatus for deciphering data according to the invention claimed in claim 18 or 19 of the present application.

FIG. 16 shows an embodiment of apparatus for deciphering data according to the invention claimed in claim 18 or 19. This embodiment is used for subjecting the enciphered digital information data obtained from the apparatus for enciphering data shown in FIG. 15 to deciphering process to reproduce the original digital information data.

The embodiment shown in FIG. 16 corresponds to a variation obtained by replacing the cipher producing portion 45 in the embodiment shown in FIG. 9 with a cipher producing portion 75 and further adding an initial value data generator 76 to the embodiment shown in FIG. 9. In FIG. 16, circuit blocks, signals and data corresponding to those of FIG. 9 are marked with the same references and further description thereof will be omitted.

In the embodiment shown in FIG. 16, the cipher producing portion 75 is constituted with a plurality of working steps 1 to N accompanied respectively with registers 1 to N and connected in series, in the same manner as the cipher producing portion 75 shown in FIG. 15. Register output data DRZ obtained from a register 44 are supplied to the working step 1 as input data and cipher data DEZ are obtained from the register N. The initial value data generator 76 is constituted with an initial value data source 77 from which predetermined data DIG for initial value are obtained and an enciphering processor 78 operative to subject the data DIG for initial value obtained from the initial value data source 77 to enciphering process to produce the initial value data DXG and send the initial value data DXG in the form of enciphered data, in the same manner as the initial value data generator 76 shown in FIG. 15.

The operations of the cipher producing portion 75 and the initial value data generator 76 in the embodiment of apparatus for deciphering data shown in FIG. 16 are performed in the same manner as those of the embodiment of apparatus for enciphering data shown in FIG. 15 and other operations of the embodiment shown in FIG. 16 are performed in the same manner as those of the embodiment shown in FIG. 9.

Figure 17:
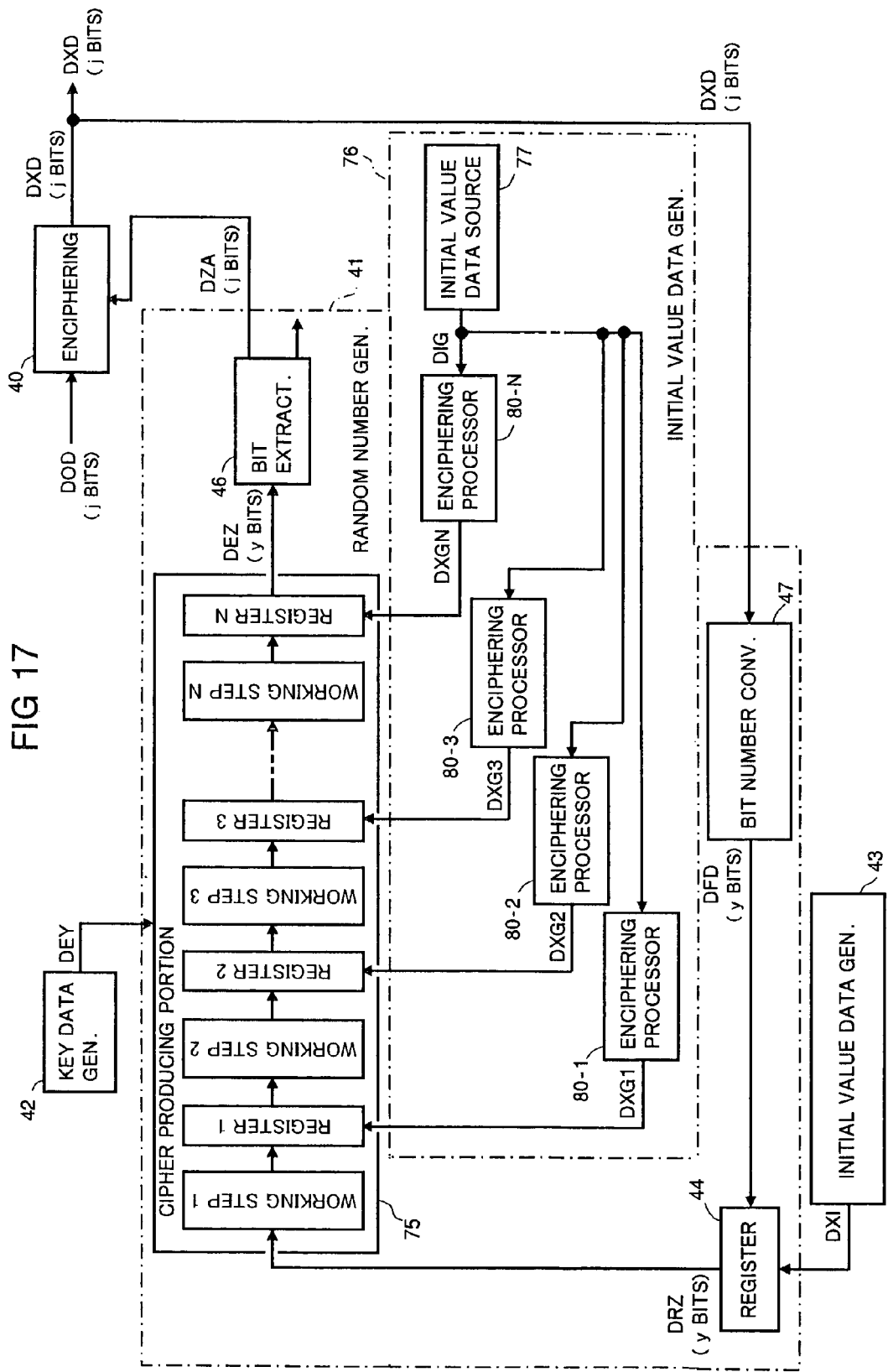
FIG. 17 is a schematic block diagram showing an embodiment of apparatus for enciphering data according to the invention claimed in any one of claims 6 to 8 of the present application.

FIG. 17 shows an embodiment of apparatus for enciphering data according to the invention claimed in any one of claims 6 to 8.

The embodiment shown in FIG. 17 corresponds to a variation obtained by replacing the enciphering processor 78 in the initial value data generator 76 in the embodiment shown in FIG. 15 with N enciphering processors 80-1, 80-2, 80-3, ..., 80-N. In FIG. 17, circuit blocks, signals and data corresponding to those of FIG. 15 are marked with the same references and further description thereof will be omitted.

In the embodiment shown in FIG. 17, data DIG for initial value obtained from an initial value data source 77 are supplied in common to each of the enciphering processors 80-1, 80-2, 80-3, ..., 80-N. The enciphering processors 80-1, 80-2, 80-3, ..., 80-N are operative to subject the data DIG for initial value supplied thereto to enciphering process to produce respectively initial value data DXG1, DXG2, DXG3, ..., DXGN which are different from one another and send the initial value data DXG1, DXG2, DXG3, ..., DXGN in the form of enciphered data.

The initial value data DXG1, DXG2, DXG3, ..., DXGN thus obtained from the enciphering processors 80-1, 80-2, 80-3, ..., 80-N are supplied to registers 1 to N in a cipher producing portion 75, respectively, from the initial value data generator 76. That is, the initial value data DXG1, DXG2, DXG3, ..., DXGN which are different from one another are supplied to the registers 1 to N in the cipher producing portion 75, respectively.

In the cipher producing portion 75, when register output data DRZ obtained from a register 44 are supplied to working step 1 as input data, the processing operations to the register output data DRZ in each of the working steps 1 and working steps 2 to N are successively carried out at every working clock and cipher data DEZ based on the register output data DRZ are obtained from the register N. The registers 1 to N operate respectively with the initial value data DXG1, DXG2, DXG3, ..., DXGN in the form of enciphered data supplied thereto. The cipher data DEZ obtained from the register N in the cipher producing portion 75 are supplied to a bit extracting portion 46.

Other operations of the embodiment shown in FIG. 17 are performed in the same manner as those of the embodiment shown in FIG. 15.

Figure 18:
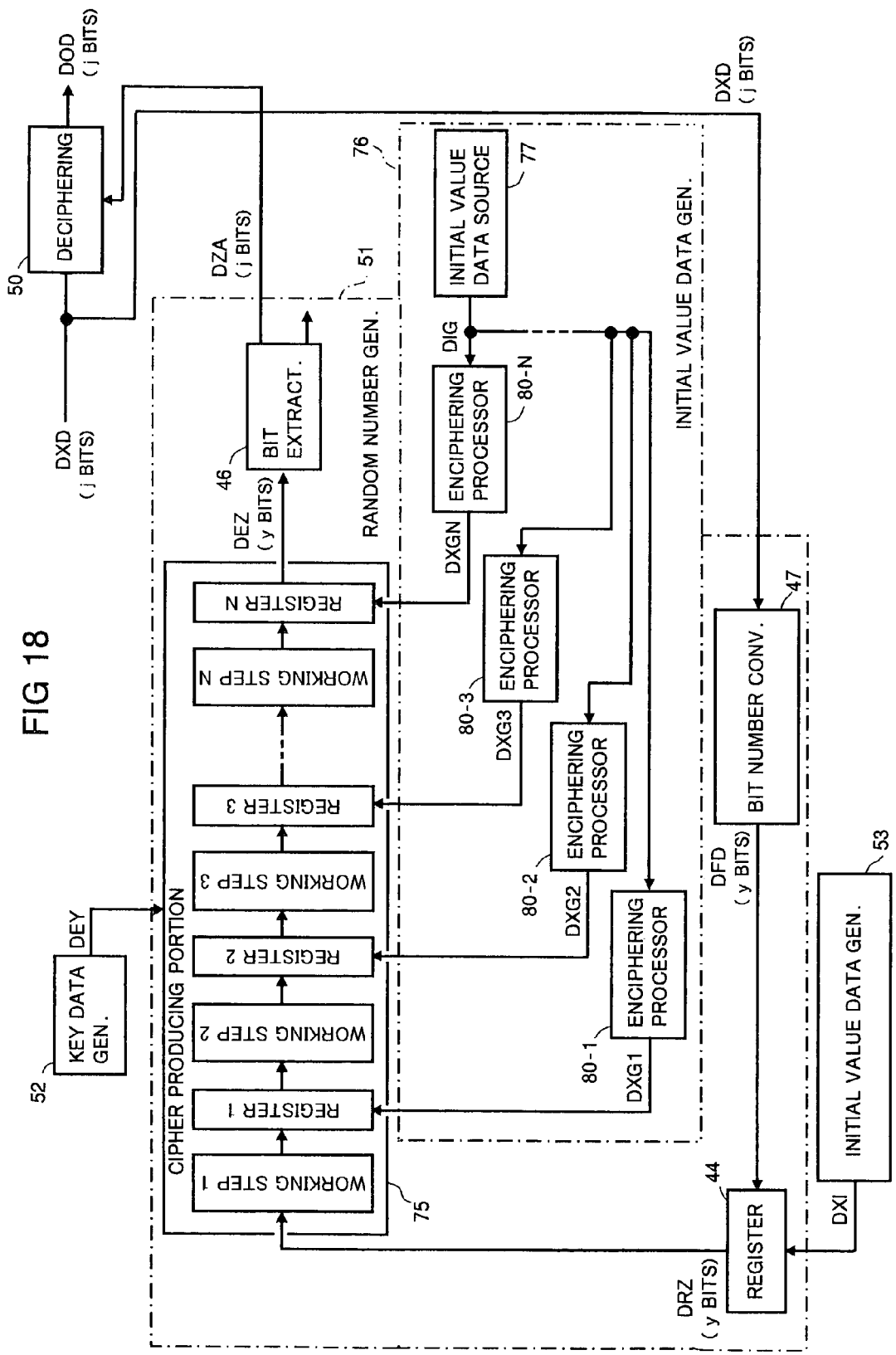
FIG. 18 is a schematic block diagram showing an embodiment of apparatus for deciphering data according to the invention claimed in any one of claims 18 to 20 of the present application.

FIG. 18 shows an embodiment of apparatus for deciphering data according to the invention claimed in any one of claims 18 to 20. This embodiment is used for subjecting the enciphered digital information data obtained from the apparatus for enciphering data shown in FIG. 17 to deciphering process to reproduce the original digital information data.

The embodiment shown in FIG. 18 corresponds to a variation obtained by replacing the enciphering processor 78 in the initial value data generator 76 in the embodiment shown in FIG. 16 with N enciphering processors 80-1, 80-2, 80-3 ..., 80-N. In FIG. 18, circuit blocks, signals and data corresponding to those of FIG. 16 are marked with the same references and further description thereof will be omitted.

In the embodiment shown in FIG. 18, the enciphering processors 80-1, 80-2, 80-3, ..., 80-N in the initial value data generator 76 are provided in the same manner as the enciphering processors 80-1, 80-2, 80-3, ..., 80-N in the initial value data generator 76 in the embodiment of apparatus for enciphering data shown in FIG. 17 and operative to subject data DIG for initial value supplied thereto from an initial value data source 77 to enciphering process to produce respectively initial value data DXG1, DXG2, DXG3, ..., DXGN which are different from one another and send the initial value data DXG1, DXG2, DXG3, ..., DXGN in the form of enciphered data.

The initial value data DXG1, DXG2, DXG3, ..., DXGN thus obtained from the enciphering processors 80-1, 80-2, 80-3, ..., 80-N are supplied to registers 1 to N in a cipher producing portion 75, respectively, from the initial value data generator 76. That is, the initial value data DXG1, DXG2, DXG3, ..., DXGN which are different from one another are supplied to the registers 1 to N in the cipher producing portion 75, respectively.

The operations of the cipher producing portion 75 in the embodiment of apparatus for deciphering data shown in FIG. 18 is performed in the same manner as those of the cipher producing portion 75 in the embodiment of apparatus for enciphering data shown in FIG. 17 and other operations of the embodiment shown in FIG. 18 are performed in the same manner as those of the embodiment shown in FIG. 16.

In the embodiment of apparatus for enciphering data shown in each of FIGS. 15 and 17, the initial value data generator 76 which is operative to supply the initial value data DXG or DXG1 to DXGN in the form of enciphered data to the registers 1 to N in the cipher producing portion 75 comprising the working steps 1 to N accompanied respectively with the registers 1 to N and connected in series for subjecting the register output data DRZ supplied thereto as the input data to enciphering process, is provided, and therefore it is extremely difficult to clarify the contents of the initial value data DXG or DXG1 to DXGN in the form of enciphered data supplied to the registers 1 to N in the cipher producing portion 75. Consequently, it is difficult to clarify the contents of the cipher data DEZ obtained from the cipher producing portion 75 and possibility of a situation in which the contents of the key data DEY obtained from the key data generator 42 are clarified based on the enciphered digital information data DXD obtained from the enciphering portion 40 is effectively reduced so that the cipher strength of the enciphered digital information data DXD is improved.

Figure 19:
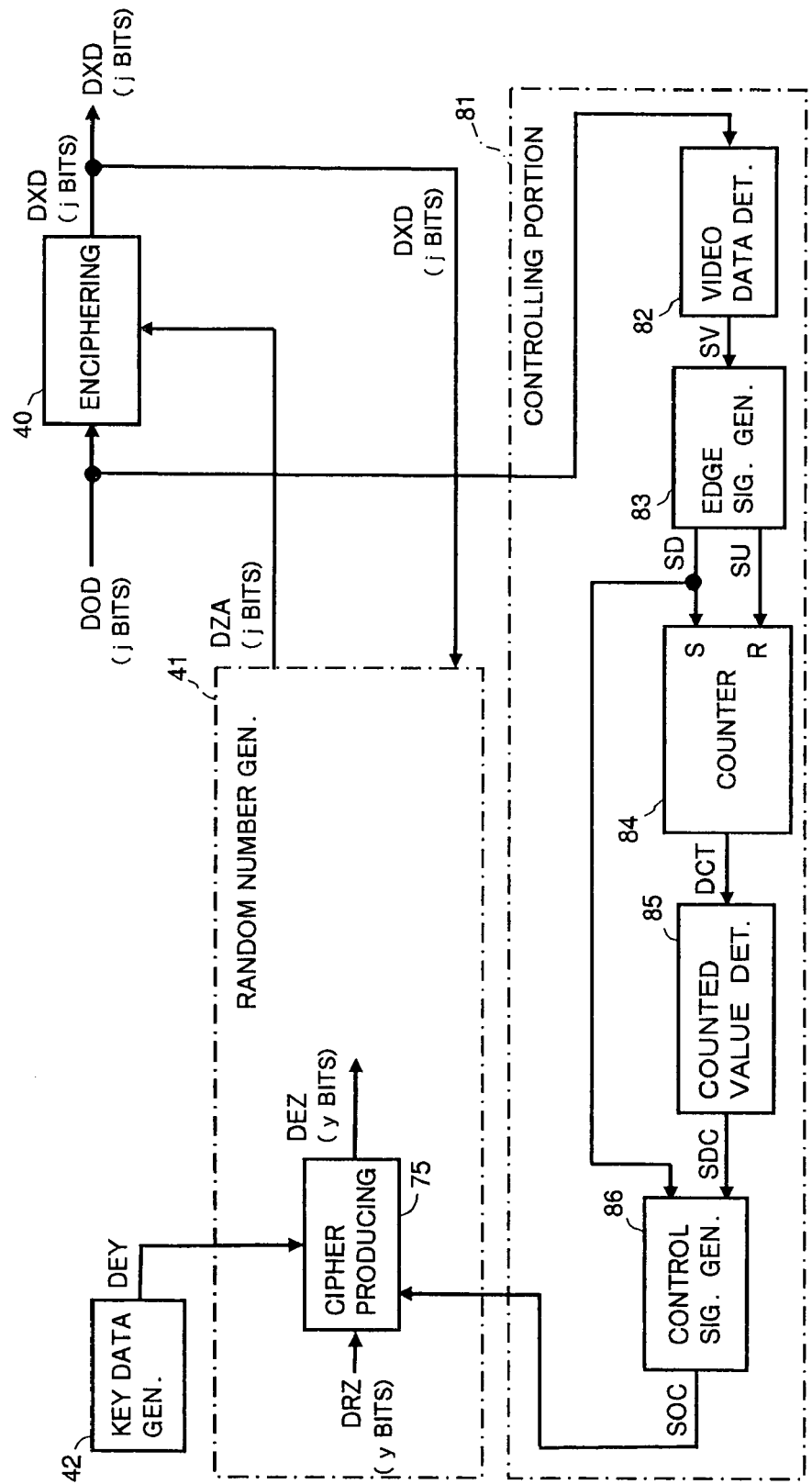
FIG. 19 is a schematic block diagram showing an embodiment of apparatus for enciphering data according to the invention claimed in any one of claims 9 to 12 of the present application.

FIG. 19 shows an embodiment of apparatus for enciphering data according to the invention claimed in any one of claims 9 to 12.

The embodiment shown in FIG. 19 is constituted with an enciphering portion 40 to which digital information data DOD in the form of j-bit word sequence data are supplied as input data, a random number generator 41 comprising a cipher producing portion 75, a key data generator 42 operative to supply the random number generator 41 with key data DEY and a controlling portion 81 for controlling the cipher producing portion 75 in the random number generator 41.

The enciphering portion 40, the random number generator 41 and the key data generator 42 are provided respectively in the same manner as the enciphering portion 40, the random number generator 41 and the key data generator 42 shown in FIG. 15. Therefore, the random number generator 41 is operative to supply the enciphering portion 40 with pseudo-random number data DZA composed of y-bit words or random number data in place of the pseudo-random number data DZA and the enciphering portion 40 is operative to subject digital information data DOD supplied thereto as input data to enciphering process responding to the pseudo-random number data DZA or the random number data obtained from the random number generator 41 to produce enciphered digital information data DXD based on the digital information data DOD to be sent therefrom. Then, the enciphered digital information data DXD obtained from the enciphering portion 40 are supplied to a bit number converting portion 47 (not shown in FIG. 19) in the random number generator 41.

The cipher producing portion 75 in the random number generator 41 is constituted with the working steps 1 to N accompanied respectively with registers 1 to N and connected in series, so that register output data DRZ obtained from a register 44 (not shown in FIG. 19) are supplied to the working step 1 as input data and cipher data DEZ are obtained from the register N, in the same manner as the cipher producing portion 75 shown in FIG. 15.

In the cipher producing portion 75, when the register output data DRZ obtained from the register 44 are supplied to the working step 1 as input data, the processing operations to the register output data DRZ in each of the working steps 1 to N are successively carried out at every working clock and the cipher data DEZ based on the register output data DRZ are obtained from the register N. This means that a time corresponding to N working clock periods is necessary in the cipher producing portion 75 during a time from a time point at which the register output data DRZ obtained from the register 44 are supplied to the working step 1 as the input data to a time point at which the cipher data DEZ based on the register output data DRZ are obtained from the register N. That is, the time point at which the cipher data DEZ based on the register output data DRZ are obtained from the register N is delayed by the time corresponding to N working clock periods compared with the time point at which the register output data DRZ obtained from the register 44 are supplied to the working step 1 as the input data.

Figure 20:
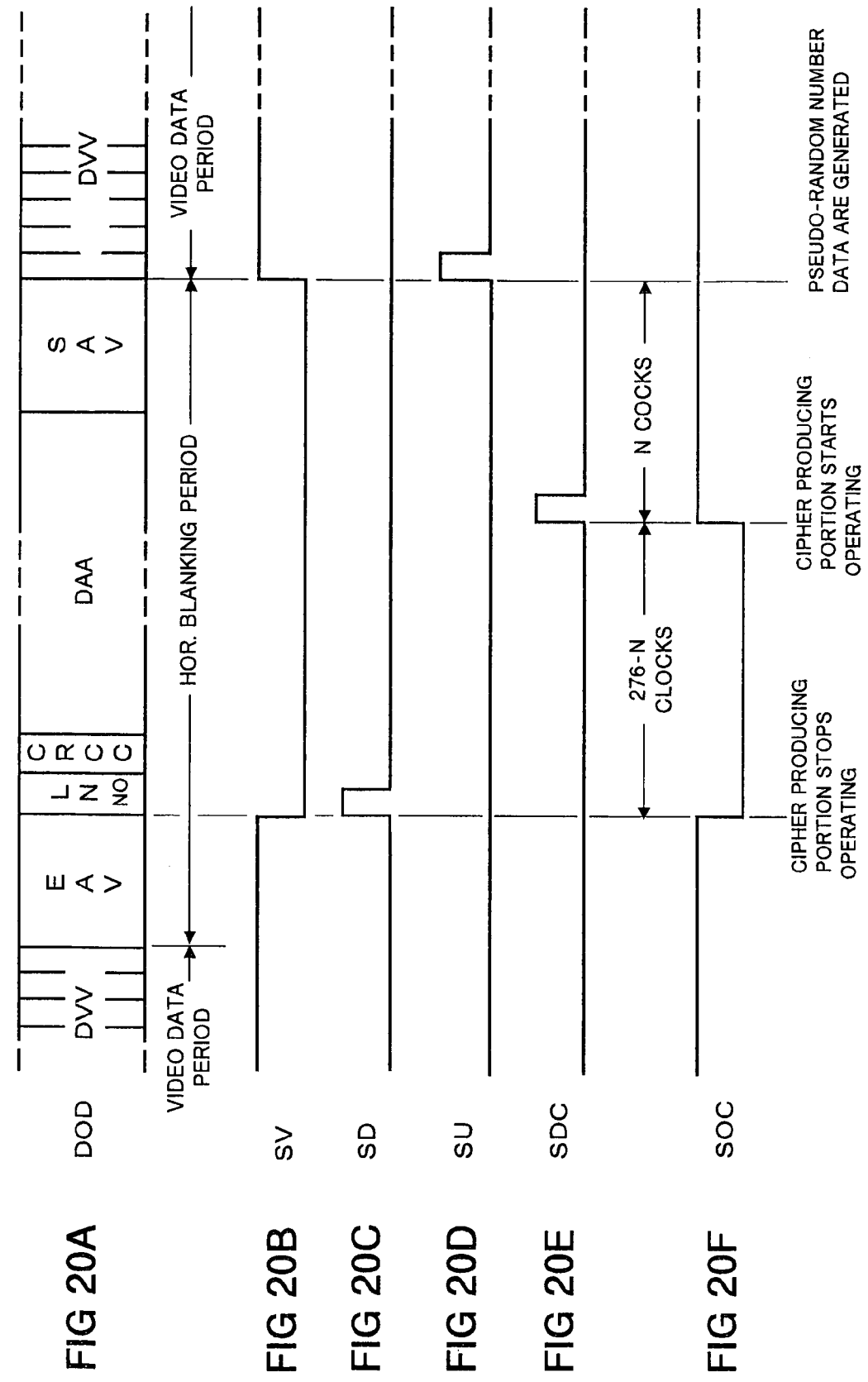
FIGS. 20A to 20F are time charts used for explaining the operation of the apparatus for enciphering data shown in FIG. 19.

The digital information data DOD in the form of j-bit word sequence data supplied to the enciphering portion 40 are constituted with, for example, an HD signal which is obtained by subjecting an HD-SDI signal to S/P conversion, as shown in FIG. 20A. In the HD signal, time reference code data EAV, line number data LNN0, error detection code data CRCC, ancillary data DAA and time reference code data SAV are provided in a portion corresponding to each line blanking period and further video data DVV are provided in a portion corresponding to each video data period successive to the portion corresponding to each line blanking period.

In the case where the HD signal formed as shown in FIG. 20A is supplied to the enciphering portion 40 as the digital information data DOD in the form of j-bit word sequence data, the enciphering portion 40 is operative to subject a portion of the HD signal which contains the video data DVV provided in the portion corresponding to each video data period and the time reference code data EAV provided in the next portion corresponding to each line blanking period to enciphering process responding to the pseudo-random number data DZA or the random number data obtained from the random number generator 41 to produce enciphered digital information data DXD in the form of j-bit word sequence data which contain enciphered video data and the line number data LNN0, the error detection code data CRCC, the ancillary data DAA and the time reference code data SAV provided in the portion corresponding to each line blanking period of the HD signal.

The HD signal formed as shown in FIG. 20A and supplied to the enciphering portion 40 as the digital information data DOD in the form of j-bit word sequence data is also supplied to the controlling portion 81.

Supposing that a particular time point means a time point earlier by a time corresponding to delay in operation of working steps 1 to N in the cipher producing portion 75, which is equal to the time corresponding to N working clock periods, than the time point at which the digital information data DOD set to be enciphered, namely, the portion of the HD signal which contains the video data DVV provided in the portion corresponding to each video data period and the time reference code data EAV provided in the next portion corresponding to each line blanking period, is commenced to be supplied to the enciphering portion 40, the controlling portion 81 is operative to cause the cipher producing portion 75 to start operating at the particular time point.

In the controlling portion 81, the digital information data DOD constituted with the HD signal are supplied to video data detector 82. The video data detector 82 is operative to detect the video data DVV and the time reference code data EAV successive to the video data DVV in the HD signal and produce a detection output signal SV which has a rising edge at the beginning of the video data DVV and a falling edge at the end of the time reference. code data EAV, as shown in FIG. 20B, based on the result of detection.

The detection output signal SV obtained from the video data detector 82 is supplied to an edge signal generator 83. The edge signal generator 83 is operative to produce a pulse signal SD in response to the falling edge of the detection output signal SV, as shown in FIG. 20C, and a pulse signal SU in response to the rising edge of the detection output signal SV, as shown in FIG. 20D. The pulse signal SD obtained from the in response to the falling edge of the detection output signal SV is supplied to a count-start terminal S of a counter 84 and the pulse signal SU obtained from the in response to the rising edge of the detection output signal SV is supplied to a count-reset terminal R of the counter 84.

The counter 84 starts counting clock signals for the HD signal in response to the pulse signal SD and stops counting the clock signals for the HD signal in response to the pulse signal SU. Accordingly, the counter operates to count the clock signals for the HD signal from a time point at the end of the time reference code data EAV provided in the portion corresponding to each line blanking period to a time point at the beginning of the video data VDD provided in the portion corresponding to the video data period successive to the portion corresponding to each line blanking period so that 276 clock signals are counted in accordance with the data format of the HD signal shown in FIG. 2. Then, the counter 84 produces counted value data DCT representing the counted value obtained by its counting operation.

The counted value data DCT obtained from the counter 84 are supplied to a counted value detector 85. The counted value detector 85 is operative to detect the counted value of [276-N] represented by the counted value data DCT in order to detect the particular time point aforementioned. When the counted value of [276-N] is detected based on the counted value data DCT, the counted value detector 85 produces a particular time point signal SDC as shown in FIG. 20E.

The particular time point signal SDC obtained from the counted value detector 85 is supplied to a control signal generator 86. The pulse signal SD obtained from the edge signal generator 83 is supplied also to the control signal generator 86. The control signal generator 86 produces a control signal SOC which rises at the rising edge of the particular time point signal SDC and falls at the rising edge of the pulse signal SD, as shown in FIG. 20F.

The controlling portion 81 supplies the cipher producing portion 75 in the random number generator 41 with the control signal SOC produced by the control signal generator 86 for causing the cipher producing portion 75 to operate from a rising edge of the control signal SOC to a falling edge of the control signal SOC so that the cipher producing portion 75 starts operating at the particular time point at which the control signal SOC rises.

As described above, in the embodiment of apparatus for enciphering data shown in FIG. 19, the cipher producing portion 75 in the random number generator 41, which is constituted with the working steps 1 to N accompanied respectively with the registers 1 to N and connected in series, is operative to start operating at the particular time point for producing the pseudo-random number data DZA based on the register output data DRZ obtained from the register 44 or the random number data at the particular time point. As a result, the pseudo-random number data DZA or the random number data obtained from the random number generator 41 are appropriately supplied to the enciphering portion 40 when the digital information data DOD set to be enciphered, namely, the portion of the HD signal which contains the video data DVV provided in the portion corresponding to each video data period and the time reference code data EAV provided in the next portion corresponding to each line blanking period, is commenced to be supplied to the enciphering portion 40.

Figure 21:
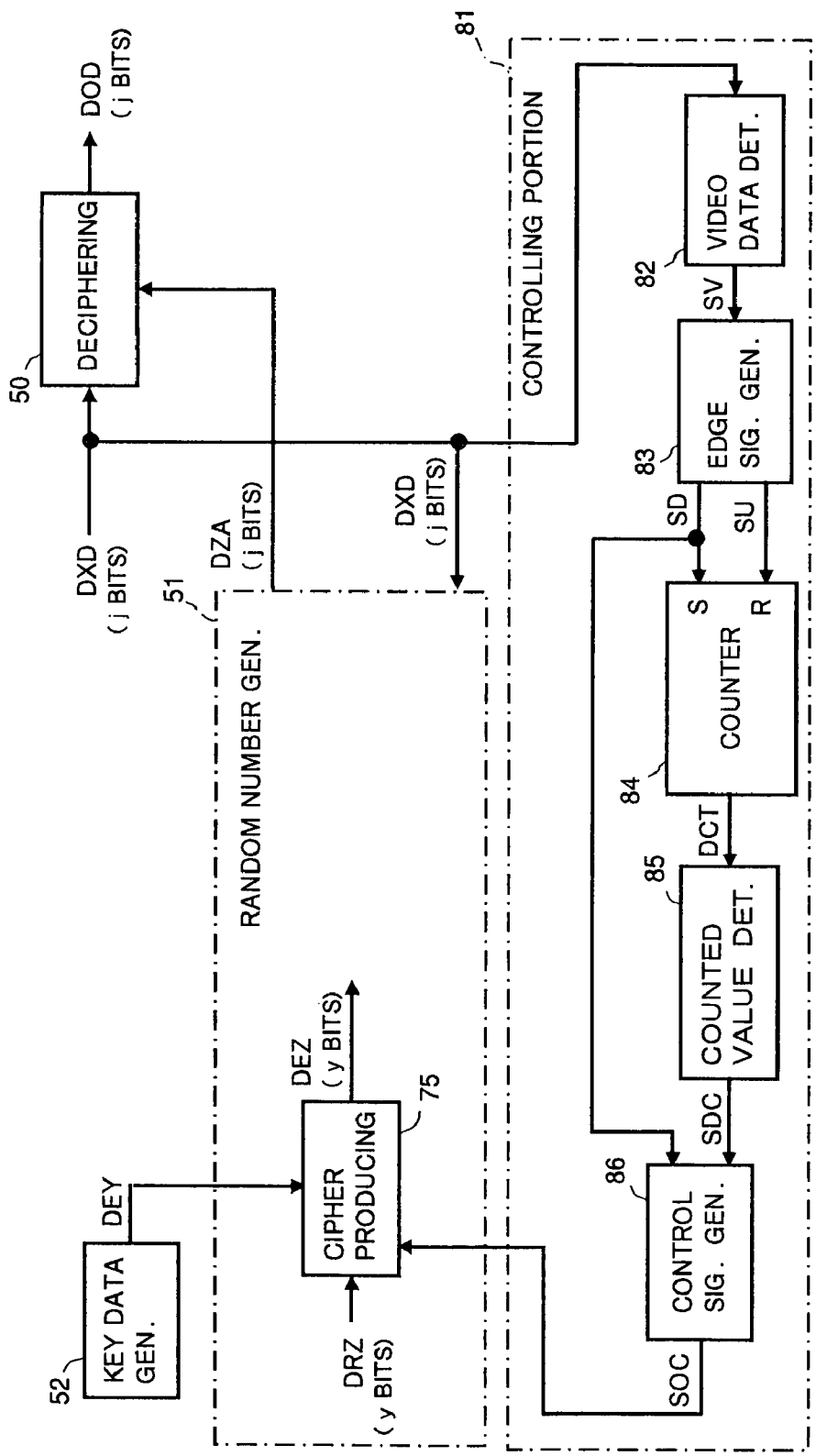
FIG. 21 is a schematic block diagram showing an embodiment of apparatus for deciphering data according to the invention claimed in any one of claims 21 to 24 of the present application.

FIG. 21 shows an embodiment of apparatus for deciphering data according to the invention claimed in any one of claims 21 to 24. This embodiment is used for subjecting the enciphered digital information data obtained from the apparatus for enciphering data shown in FIG. 19 to deciphering process to reproduce the original digital information data.

The embodiment shown in FIG. 21 is constituted with a deciphering portion 50 to which the enciphered digital information data DXD in the form of j-bit word sequence data produced by the apparatus for enciphering data shown in FIG. 19 are supplied, a random number generator 51 comprising a cipher producing portion 75, a key data generator 52 operative to supply the random number generator 51 with key data DEY and a controlling portion 81 for controlling the cipher producing portion 75 in the random number generator 51.

The deciphering portion 50, the random number generator 51 and the key data generator 52 are provided respectively in the same manner as the deciphering portion 50, the random number generator 51 and the key data generator 52 shown in FIG. 16. Therefore, the random number generator 51 is operative to supply the deciphering portion 50 with pseudo-random number data DZA composed of y-bit words or random number data in place of the pseudo-random number data DZA and the deciphering portion 50 is operative to subject the enciphered digital information data DXD supplied thereto as input data to deciphering process responding to the pseudo-random number data DZA or the random number data obtained from the random number generator 51 to reproduce the original digital information data DOD to be sent therefrom. Then, the enciphered digital information data DXD supplied to the deciphering portion 50 are supplied also to a bit number converting portion 47 (not shown in FIG. 21) in the random number generator 51.

The cipher producing portion 75 in the random number generator 51 is constituted with the working steps 1 to N accompanied respectively with registers 1 to N and connected in series, so that register output data DRZ obtained from a register 44 (not shown in FIG. 21) are supplied to the working step 1 as input data and cipher data DEZ are obtained from the register N, in the same manner as the cipher producing portion 75 shown in FIG. 16.

In the cipher producing portion 75, when the register output data DRZ obtained from the register 44 are supplied to the working step 1 as input data, the processing operations to the register output data DRZ in each of the working steps 1 to N are successively carried out at every working clock and the cipher data DEZ based on the register output data DRZ are obtained from the register N. This means that a time corresponding to N working clock periods is necessary in the cipher producing portion 75 during a time from a time point at which the register output data DRZ obtained from the register 44 are supplied to the working step 1 as the input data to a time point at which the cipher data DEZ based on the register output data DRZ are obtained from the register N. That is, the time point at which the cipher data DEZ based on the register output data DRZ are obtained from the register N is delayed by the time corresponding to N working clock periods compared with the time point at which the register output data DRZ obtained from the register 44 are supplied to the working step 1 as the input data.

The enciphered digital information data DXD in the form of j-bit word sequence data supplied to the deciphering portion 50 are produced by the apparatus for enciphering data shown in FIG. 19 so as to contain the enciphered video data, which are obtained by subjecting the video data DVV provided the portion corresponding to each video data period and the time reference code data EAV provided in the next portion corresponding to each line blanking period of the HD signal to enciphering process, and the line number data LNN0, the error detection code data CRCC, the ancillary data DAA and the time reference code data SAV provided in the portion corresponding to each line blanking period of the HD signal. Such enciphered digital information data DXD in the form of j-bit word sequence data supplied to the deciphering portion 50 are further supplied to the controlling portion 81.

Supposing that a particular time point means a time point earlier by a time corresponding to delay in operation of working steps 1 to N in the cipher producing portion 75, which is equal to the time corresponding to N working clock periods, than the time point at which the enciphered digital information data DXD set to be enciphered, namely, the enciphered video data which are obtained by subjecting the video data DVV provided the portion corresponding to each video data period and the time reference code data EAV provided in the next portion corresponding to each line blanking period of the HD signal to enciphering process, are commenced to be supplied to the deciphering portion 50, the controlling portion 81 is operative to cause the cipher producing portion 75 to start operating at the particular time point.

In the controlling portion 81 which is constituted substantially in the same manner as the controlling portion 81 shown in FIG. 19, the enciphered digital information data DXD the form of j-bit word sequence data are supplied to video data detector 82. The video data detector 82 is operative to detect the enciphered video data contained in the enciphered digital information data DXD and produce a detection output signal SV which has a rising edge at the beginning of the enciphered video data and a falling edge at the end of the enciphered video data, based on the result of detection. Each of an edge signal generator 83, a counter 84, a counted value detector 85 and a control signal generator 86 operates in the same manner as that in the controlling portion 81 shown in FIG. 19.

Consequently, the controlling portion 81 supplies the cipher producing portion 75 in the random number generator 51 with a control signal SOC produced by the control signal generator 86 so that the cipher producing portion 75 starts operating at the particular time point.

As described above, in the embodiment of apparatus for deciphering data shown in FIG. 21, the cipher producing portion 75 in the random number generator 51, which is constituted with the working steps 1 to N accompanied respectively with the registers 1 to N and connected in series, is operative to start operating at the particular time point for producing the pseudo-random number data DZA based on the register output data DRZ obtained from the register 44 or the random number data at the particular time point. As a result, the pseudo-random number data DZA or the random number data obtained from the random number generator 51 are appropriately supplied to the deciphering portion 50 when the enciphered digital information data DXD, namely, the enciphered video data which are obtained by subjecting the video data DVV provided the portion corresponding to each video data period and the time reference code data EAV provided in the next portion corresponding to each line blanking period of the HD signal to enciphering process, are commenced to be supplied to the deciphering portion 50.

Incidentally, although the controlling portion 18 in each of the embodiment of apparatus for enciphering data shown in FIG. 19 and the embodiment of apparatus for deciphering data shown in FIG. 21 is operative to cause the cipher producing portion 75 in each of the random number generators 41 and 51 to start operating at the particular time point, it is also possible to arrange the controlling portion 18 in each of the embodiment of apparatus for enciphering data shown in FIG. 19 and the embodiment of apparatus for deciphering data shown in FIG. 21 so as to cause the cipher producing portion 75 in each of the random number generators 41 and 51 to start operating before the particular time point.

In the embodiment of apparatus for enciphering data shown in FIG. 19, the controlling portion 81 operative to cause the cipher producing portion 75, which comprises the working steps 1 to N connected in series for subjecting the register output data DRZ supplied thereto from the register 44 as the input data to enciphering process, to start operating at the particular time point earlier at least by the time corresponding to delay in operation of the working steps 1 to N than the time point at which the digital information data DOD are commenced to be supplied to the enciphering portion 40, is provided, and therefore the cipher data DEZ are appropriately obtained from the cipher producing portion 75 and the pseudo-random number data DZA or the random number data are appropriately supplied to the enciphering portion 40 when the digital information data DOD are commenced to be supply to the deciphering portion 40. Consequently, possibility of a situation in which the contents of the cipher data DEZ obtained from the cipher producing portion 75 are clarified based on the enciphered digital information data DXD obtained from the enciphering portion 40 during the time from the time point at which the cipher producing portion 75 starts operating to the time point at which the time corresponding to delay in operation of the working steps 1 to N in the cipher producing portion 75 elapses is effectively reduced so that the cipher strength of the enciphered digital information data DXD is improved.

APPLICABILITY FOR INDUSTRIAL USE

As apparent from the above description, in the apparatus for enciphering data constituted in accordance with the invention claimed in any one of claims 1 to 5 of the present application, the initial value data supplying portion which is operative to supply the initial value data in the form of enciphered data to the data supplying portion for supplying the cipher producing portion with the input data, is provided, and therefore it is extremely difficult to clarify the contents of the initial value data supplied to the data supplying portion. Consequently, possibility of a situation in which the contents of each of the input data supplied to the cipher producing portion and the cipher data obtained from the cipher producing portion are clarified based on the enciphered digital information data obtained from the enciphering portion and as a result the contents of the key data are clarified, is effectively reduced so that the cipher strength of the enciphered digital information data is improved.

In the apparatus for enciphering data constituted in accordance with the invention claimed in any one of claims 6 to 8 of the present application, the second initial value data supplying portion which is operative to. supply the initial value data in the form of enciphered data to the registers in the cipher producing portion comprising a plurality of working steps each accompanied with the register and connected in series for processing the input data and operative to produce the cipher data which is used for supplying the enciphering portion for producing the enciphered digital information data with the pseudo-random number data or random number data, is provided, and therefore it is extremely difficult to clarify the contents of the initial value data supplied to the registers in the cipher producing portion. Consequently, it is difficult to clarify the contents of the cipher data obtained from the cipher producing portion and possibility of a situation in which the contents of the key data are clarified based on the enciphered digital information data obtained from the enciphering portion is effectively reduced so that the cipher strength of the enciphered digital information data is improved.

In the apparatus for enciphering data constituted in accordance with the invention claimed in any one of claims 9 to 12 of the present application, the controlling portion operative to cause the cipher producing portion, which comprises a plurality of working steps connected in series for processing the input data and is operative to produce the cipher data which is based on the key data and used for supplying the enciphering portion for producing the enciphered digital information data with the pseudo-random number data or random number data, to start operating at the particular time point earlier at least by the time corresponding to delay in operation of the working steps than the time point at which the digital information data are commenced to be supplied to the enciphering portion, is provided, and therefore the cipher data are appropriately obtained from the cipher producing portion and the pseudo-random number data or random number data are appropriately supplied to the enciphering portion when the digital information data are commenced to be supply to the enciphering portion. Consequently, possibility of a situation in which the contents of the cipher data obtained from the cipher producing portion are clarified based on the enciphered digital information data obtained from the enciphering portion during the time from the time point at which the cipher producing portion starts operating to the time point at which the time corresponding to delay in operation of the working steps in the cipher producing portion elapses is effectively reduced so that the cipher strength of the enciphered digital information data is improved.

In the apparatus for deciphering data constituted in accordance with the invention claimed in any one of claims 13 to 24 of the present application, the initial value data supplying portion which is operative to supply the initial value data in the form of enciphered data to the data supplying portion for supplying the cipher producing portion with the input data, the initial value data supplying portion which is operative to supply the initial value data in the form of enciphered data to the registers in the cipher producing portion comprising a plurality of working steps each accompanied with the register and connected in series for processing the input data and operative to produce the cipher data which is used for supplying the deciphering portion for subjecting the enciphered digital information data to the deciphering process with the pseudo-random number data or random number data, or the controlling portion operative to cause the cipher producing portion, which comprises a plurality of working steps connected in series for processing the input data and is operative to produce the cipher data which is based on the key data and used for supplying the deciphering portion for subjecting the enciphered digital information data to the deciphering process with the pseudo-random number data or random number data, to start operating at the particular time point earlier at least by the time corresponding to delay in operation of the working steps than the time point at which the enciphered digital information data are commenced to be supplied to the deciphering portion, is provided, and therefore the deciphering process by which the enciphered digital information data, which are obtained by subjecting digital information data to such enciphering process as to produce enciphered data having the improved cipher strength, is subjected to the deciphering process to reproduce the original digital information data, is surely and appropriately carried out.

The invention claimed is:

1. An apparatus for enciphering data comprising:
a cipher producing portion for subjecting input data to enciphering process in accordance with rules determined by key data to produce cipher data;
an enciphering portion for subjecting digital information data to enciphering process responding to one of random number data and pseudo-random number data to produce enciphered digital information data,
wherein the random number data and pseudo-random number data is extracted from the cipher data obtained based on the key data;
a data supplying portion for producing the input data for the cipher producing portion with initial value data supplied thereto and supplying the cipher producing portion with the produced input data; and
an initial value data supplying portion for supplying the data supplying portion with the initial value data in the form of enciphered data.

2. An apparatus for enciphering data according to claim 1, wherein the initial value data supplying portion comprises an initial value data source and an enciphering processor for subjecting data for initial value obtained from the initial value data source to enciphering process to produce the initial value data to be supplied to the data supplying portion.

3. An apparatus for enciphering data according to claim 2, wherein the initial value data supplying portion is operative to extract particular data from the digital information data supplied to the enciphering portion for obtaining the data for initial value.

4. An apparatus for enciphering data according to claim 3, wherein digital video data are supplied to the enciphering portion as the digital information data and the initial value data supplying portion is operative to extract line number data from the digital video data for obtaining the data for initial value.

5. An apparatus for enciphering data according to claim 1, wherein the initial value data supplying portion comprises an initial value data source, an enciphering processor for subjecting data for initial value obtained from the initial value data source to enciphering process and a counter for causing enciphered data for initial value obtained from the enciphering processor to vary successively.

6. An apparatus for enciphering data comprising:
a cipher producing portion for subjecting input data to enciphering process in accordance with rules determined by key data to produce cipher data;
an enciphering portion for subjecting digital information data to enciphering process responding to one of random number data and pseudo-random number data to produce enciphered digital information data,
wherein the random number data and pseudo-random number data is extracted from the cipher data obtained based on the key data;
a data supplying portion for producing the input data for the cipher producing portion with initial value data supplied thereto and supplying the cipher producing portion with the produced input data; and
a first initial value data supplying portion for supplying the data supplying portion with the initial value data,
wherein the cipher producing portion comprises a plurality of working steps each accompanied with a register and connected in series and is provided with a second initial value data supplying portion connected thereto for supplying the registers with initial value data in the form of enciphered data.

7. An apparatus for enciphering data according to claim 6, wherein the second initial value data supplying portion is operative to supply the registers with enciphered initial value data different from one another, respectively.

8. An apparatus for enciphering data according to claim 7, wherein the second initial value data supplying portion comprises an initial value data source and a plurality of enciphering processor for subjecting data for initial value obtained from the initial value data source to enciphering process to produce respectively the enciphered initial value data different from one another.

9. An apparatus for enciphering data comprising;
a cipher producing portion for subjecting input data to enciphering process in accordance with rules determined by key data to produce cipher data;
an enciphering portion for subjecting digital information data to enciphering process responding to one of random number data and pseudo-random number data to produce enciphered digital information data,
wherein the random number data and pseudo-random number data is extracted from the cipher data obtained based on the key data;
a data supplying portion for producing the input data for the cipher producing portion with initial value data supplied thereto and supplying the cipher producing portion with the produced input data; and
an initial value data supplying portion for supplying the data supplying portion with the initial value data,
wherein the cipher producing portion comprises a plurality of working steps each accompanied with a register and connected in series and is provided with a controlling portion connected thereto for causing the cipher producing portion to start operating at a particular time point earlier at least by a time corresponding to delay in operation of the working steps than a time point at which the digital information data are commenced to be supplied to the enciphering portion.

10. An apparatus for enciphering data according to claim 9, wherein the controlling portion is operative to cause the cipher producing portion to operate in such a manner that the enciphering portion is appropriately supplied with one of random number data and pseudo-random number data produced on the basis of the cipher data obtained from the cipher producing portion when the digital information data are commenced to be supplied to the enciphering portion.

11. An apparatus for enciphering data according to claim 10, wherein the digital information data are intermittently supplied to the enciphering portion and the controlling portion is operative to detect a particular time point by measuring a time from a time point at which the digital information data are intermitted to be supplied to the enciphering portion.

12. An apparatus for enciphering data according to claim 11, wherein the controlling portion comprises a counter operative to start counting clock signals for the digital information signal supplied to the enciphering portion at the time point at which the digital information data are intermitted to be supplied to the enciphering portion and a control signal generator operative to detect the particular time point and produce a control signal for causing the cipher producing portion to start operating when a counted result of the counter reaches a counted value corresponding to a time from the time point at which the digital information data are intermitted to be supplied to the enciphering portion to the particular time point.

13. An apparatus for deciphering data comprising:
a cipher producing portion for subjecting input data to enciphering process in accordance with rules determined by key data to produce cipher data;
a deciphering portion for subjecting enciphered digital information data to deciphering process responding to one of random number data and pseudo-random number data to reproduce original digital information data,
wherein the random number data and pseudo-random number data is extracted from the cipher data obtained based on the key data;
a data supplying portion for producing the input data for the cipher producing portion with initial value data supplied thereto and supplying the cipher producing portion with the produced input data; and
an initial value data supplying portion for supplying the data supplying portion with the initial value data in the form of enciphered data.

14. An apparatus for deciphering data according to claim 13, wherein the initial value data supplying portion comprises an initial value data source and an enciphering processor for subjecting data for initial value obtained from the initial value data source to enciphering process to produce the initial value data to be supplied to the data supplying portion.

15. An apparatus for deciphering data according to claim 14, wherein the initial value data supplying portion is operative to extract particular data from the enciphered digital information data supplied to the deciphering portion for obtaining the data for initial value.

16. An apparatus for deciphering data according to claim 15, wherein enciphered video data are supplied to the deciphering portion as the enciphered digital information data and the initial value data supplying portion is operative to extract line number data from the enciphered video data for obtaining the data for initial value.

17. An apparatus for deciphering data according to claim 13, wherein the initial value data supplying portion comprises an initial value data source, an enciphering processor for subjecting data for initial value obtained from the initial value data source to enciphering process and a counter for causing enciphered data for initial value obtained from the enciphering processor to vary successively.

18. An apparatus for deciphering data comprising:
a cipher producing portion for subjecting input data to enciphering process in accordance with rules determined by key data to produce cipher data;
a deciphering portion for subjecting enciphered digital information data to deciphering process responding to one of random number data and pseudo-random number data to reproduce original digital information data,
wherein the random number data and pseudo-random number data is extracted from the cipher data obtained based on the key data;
a data supplying portion for producing the input data for the cipher producing portion with initial value data supplied thereto and supplying the cipher producing portion with the produced input data; and
a first initial value data supplying portion for supplying the data supplying portion with the initial value data,
wherein the cipher producing portion comprises a plurality of working steps each accompanied with a register and connected in series and is provided with a second initial value data supplying portion connected thereto for supplying the registers with initial value data in the form of enciphered data.

19. An apparatus for deciphering data according to claim 18, wherein the second initial value data supplying portion is operative to supply the registers with enciphered initial value data different from one another, respectively.

20. An apparatus for deciphering data according to claim 19, wherein the second initial value data supplying portion comprises an initial value data source and a plurality of enciphering processor for subjecting data for initial value obtained from the initial value data source to enciphering process to produce respectively the enciphered initial value data different from one another.

21. An apparatus for deciphering data comprising:
a cipher producing portion for subjecting input data to enciphering process in accordance with rules determined by key data to produce cipher data;
a deciphering portion for subjecting enciphered digital information data to deciphering process responding to one of random number data and pseudo-random number data to reproduce original digital information data,
wherein the random number data and pseudo-random number data is extracted from the cipher data obtained based on the key data;
a data supplying portion for producing the input data for the cipher producing portion with initial value data supplied thereto and supplying the cipher producing portion with the produced input data; and
an initial value data supplying portion for supplying the data supplying portion with the initial value data,
wherein the cipher producing portion comprises a plurality of working steps each accompanied with a register and connected in series and is provided with a controlling portion connected thereto for causing the cipher producing portion to start operating at a particular time point earlier at least by a time corresponding to delay in operation of the working steps than a time point at which the enciphered digital information data are commenced to be supplied to the deciphering portion.

22. An apparatus for deciphering data according to claim 21, wherein the controlling portion is operative to cause the cipher producing portion to operate in such a manner that the deciphering portion is appropriately supplied with one of random number data and pseudo-random number data produced on the basis of the cipher data obtained from the cipher producing portion when the enciphered digital information data are commenced to be supplied to the deciphering portion.

23. An apparatus for deciphering data according to claim 22, wherein the enciphered digital information data are intermittently supplied to the deciphering portion and the controlling portion is operative to detect a particular time point by measuring a time from a time point at which the enciphered digital information data are intermitted to be supplied to the deciphering portion.

24. An apparatus for deciphering data according to claim 23, wherein the controlling portion comprises a counter operative to start counting clock signals for the enciphered digital information signal supplied to the deciphering portion at the time point at which the enciphered digital information data are intermitted to be supplied to the deciphering portion and a control signal generator operative to detect the particular time point and produce a control signal for causing the cipher producing portion to start operating when a counted result of the counter reaches a counted value corresponding to a time from the time point at which the enciphered digital information data are intermitted to be supplied to the deciphering portion to the particular time point.

* * * * *